United States Patent [19]

Moriyama

[11] Patent Number: 4,604,655
[45] Date of Patent: Aug. 5, 1986

[54] METHOD OF RECORDING AND REPRODUCING VIDEO FORMAT SIGNAL

[75] Inventor: Yoshiaki Moriyama, Tokorozawa, Japan

[73] Assignee: Pioneer Electronic Corporation, Tokyo, Japan

[21] Appl. No.: 544,245

[22] Filed: Oct. 21, 1983

[30] Foreign Application Priority Data

Oct. 23, 1982 [JP] Japan .................. 57-186568
Oct. 23, 1982 [JP] Japan .................. 57-186569

[51] Int. Cl.$^4$ .................................. H04N 5/91
[52] U.S. Cl. .................................. 358/343
[58] Field of Search ............ 358/343; 369/19.1; 360/33.1, 34.1

[56] References Cited

U.S. PATENT DOCUMENTS

| | | | |
|---|---|---|---|
| 4,065,795 | 12/1977 | Shutterly .................. | 360/19.1 |
| 4,246,615 | 1/1981 | Shiraishi et al. .......... | 360/19.1 |
| 4,390,906 | 6/1983 | Furumoto et al. ......... | 360/19.1 |
| 4,450,488 | 5/1984 | Golding ................... | 360/19.1 |
| 4,468,710 | 8/1984 | Hashimoto et al. ....... | 360/19.1 |

Primary Examiner—Donald McElheny, Jr.
Attorney, Agent, or Firm—Schwartz, Jeffery, Schwaab, Mack, Blumenthal & Evans

[57] ABSTRACT

A method of recording and reproducing a video format signal on and from a recording medium, wherein the video format signal is reproduced on a two-dimensional picture area divided into sections having predetermined identification numbers respectively allocated thereto, the sections consisting of at least one section for inserting sound information, at least one section for inserting control information and remaining sections for inserting picture information. The control information contains pieces of information indicative of the identification number of the section into which the sound information is to be inserted. The sound and control information is recorded on the recording medium in the form of binary codes each consisting of a predetermined number of bits, each of which is modulated to have its level inverted between every adjacent two bits before the bit is recorded on the recording medium. An occurrence of a burst error is detected through detection of non-inverted bits in the aforesaid binary codes during reproduction of the picture and sound information.

29 Claims, 25 Drawing Figures

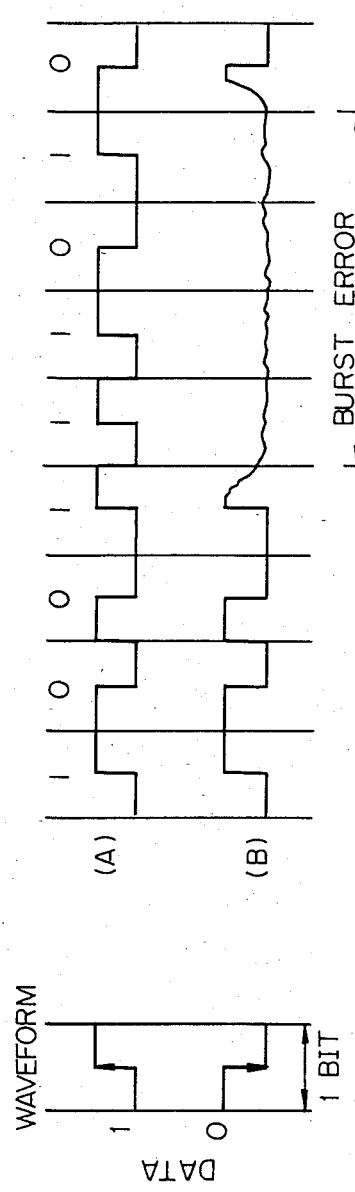
Fig. 13B
Fig. 13A
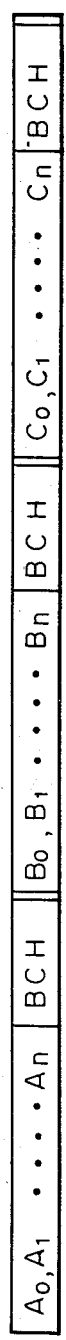
Fig. 14
$C_i = A_i + B_i$

… (continued)

METHOD OF RECORDING AND REPRODUCING VIDEO FORMAT SIGNAL

FIELD OF THE INVENTION

The present invention relates to a method of recording and reproducing a video format signal and, particularly, to a method of recording and reproducing a video format signal wherein picture and sound information is recorded as a video format signal on one and the same track of a recording medium such as a video disc.

BACKGROUND OF THE INVENTION

In recording sound information and associated on one and the same track of a recording medium, it is known to have the sound information compressed in terms of time and inserted into portions of the video format signal and to have the picture information inserted into the remaining portions of the video format signal. In this known method, it is required to have the picture and sound information inserted into the video format of a recording medium in accordance with a predetermined pattern. This makes it impossible to reproduce the recorded information in different modes.

A video format signal contains not only the picture and sound information but control information necessary for the reproduction of the picture and sound information. Such coninformation is predominant over the operation of the information recording and reproducing system and is required to be cleared of errors when the picture and sound information is to be reproduced. Where the picture and sound information is to be recorded on and reproduced from a recording medium of a certain nature such as a video disc, not only errors in the bits of data but burst or continued errors tend to take place due to the presence of, for example, a scratch or a hair on the surface of the recording medium. Meticulous and exacting correction of these errors in the control information is indispensable when reproducing a video format signal from such a recording medium.

It is, accordingly, an important object of the present invention to provide an improved method of recording and reproducing a video format signal in various modes such as continuous, stepped and slow motion picture modes and a still picture mode.

It is another important object of the present invention to provide an improved method of recording and reproducing a video format signal by assuredly correcting the errors which may be involved in the control information as well as the sound information in the video format signal during reproduction of the video format signal.

SUMMARY OF THE INVENTION

In accordance with the present invention, there is provided a method of recording and reproducing a video format signal containing picture information, sound information and control information on and from a recording medium, wherein the video format signal is reproduced on a two-dimensional picture area which is divided into a plurality of sections having predetermined identification numbers respectively allocated thereto, the sections consisting of at least one section for inserting the sound information thereinto, at least one section for inserting the control information thereinto and remaining sections for inserting the picture information thereinto, the control information contains pieces of information indicative of the identification number of the section into which the sound information is to be inserted, the sound information and the control information is recorded on the recording medium in the form of binary codes each consisting of a predetermined number of bits of data, each of the bits of data is modulated in such a manner as to have its level inverted between every adjacent two bits before the bit is recorded on the recording medium, and an occurrence of a burst error is detected through detection of non-inverted bits in the aforesaid binary codes during reproduction of the picture and sound information.

Preferably, above mentioned binary codes are entrained on horizontal scanning lines during recording of the picture and sound information on the recording medium in such a manner that the binary codes are re-arranged in sequence in each of the horizontal scanning periods and between the individual horizontal scanning periods. In this instance, the binary codes recorded on the recording medium are checked for errors and cleared of the errors in each of the horizontal scanning periods and between the individual horizontal scanning periods during reproduction of the picture and sound information. Furthermore, the sections of the aforesaid picture area consist of a plurality of groups preferably having identification numbers respectively allocated thereto and wherein the control information contains pieces of information indicative of the respective identification numbers of the groups. The picture information consists of pieces of information to produce continuous motion pictures. In this instance, the sound information is preferably recorded in time axially compressed form on the recording medium and is registered in information storage means and is time axially extended and read out from the information storage means during reproduction of the picture and sound information.

BRIEF DESCRIPTION OF THE DRAWINGS

The features and advantages of an information recording and reproducing method according to the present invention will be more clearly appreciated from the following description taken in conjunction with the accompanying drawings in which like reference numerals, characters and signs designate similar or corresponding entities and in which:

FIG. 13A is a view showing a preferred example of the principles on which control information is to be modulated in an error correction system used to carry out a method according to the present invention;

FIG. 13B is a view showing examples of the waveforms of the control information modulated on the principle depicted in FIG. 13A;

FIG. 14 is a schematic view showing a principle on which an error correction code is to be produced on the basis of the codes of control information in an error correcting system used to carry out a method according to the present invention;

DETAILED DESCRIPTION OF THE INVENTION

Figure 1:
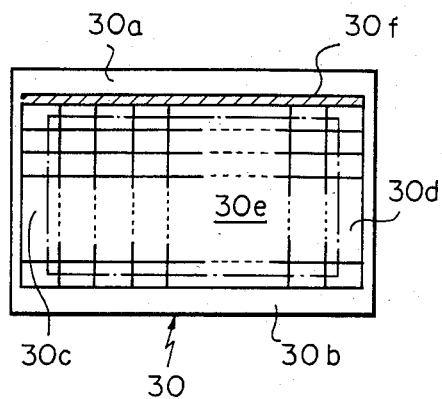
FIG. 1 is a schematic view showing a two-dimensional picture area to be displayed on a video display screen when a video format signal to produce one field or frame of picture is reproduced.

In FIG. 1 of the drawings, there is shown a generally rectangular two-dimensional display area 30 of the display unit which forms part of a video disc player. The display area 30 includes blanking zones 30a and 30b constituted by upper and lower horizontal marginal portions, respectively, of the display area 30 and horizontal blanking zones 30c and 30d constituted by left and right vertical marginal portions, respectively, of the display area 30. The rectangular zone shown enclosed by dot-and-dash lines and thus surrounded by the upper and lower vertical blanking zones 30a and 30b and the left and right horizontal blanking zones 30c and 30d is the area to actually appear on the display screen of a monitoring television receiver (not shown). The two-dimensional display area 30 shown in FIG. 1 further includes a control information zone or block 30f which is constituted by a horizontally elongated area consisting of several horizontal scanning lines which follow the upper vertical blanking zone 30a, the control information zone or block 30f being shown shaded with down-to-the-left hatching. The area excluding the blanking zones 30a to 30d and the control information zone or block 30f is herein referred to as picture zone and is divided into an m×n number of rectangular sections or blocks formed by an m number of columns and an n number of rows. Predetermined identification numbers are respectively allocated to these rectangular sections or blocks. Out of these m×n number of sections or blocks of the picture zone, a predetermined number of sections or blocks are used as sound information sections or blocks and are designated as such by some of the pieces of information included in the control information to be inserted into the control information zone or block 30f. Thus, the control information contained in the video format signal used in a method according to the present invention contains pieces of information indicative of the identification numbers of the sections or blocks into which the sound information is to be introduced. The sound information to be recorded on and read out from a video disc is compressed time axially or in terms of time and is to be introduced into these particular sections or blocks of the picture zone during reproduction of the sound information. Into the remaining ones of the m×n number of sections or blocks of the picture zone are to be inserted the pieces of picture information which are to be reproduced. Instead of designating the sections or blocks to be used as the sound information sections or blocks as above described, the sections or blocks to be used as the picture information sections or blocks may be specified as such by some of the pieces of information included in the control information to be inserted into the control information zone or block 30f. For this purpose, the control information contained in the video format signal may contain pieces of information indicative of the identification numbers of the sections or blocks into which the picture information is to be introduced.

Figure 2:
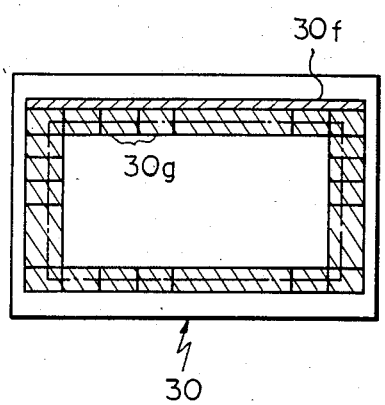
FIG. 2 is a view similar to FIG. 1 but shows sound and picture information zones of the two-dimensional picture area shown in FIG. 1.

In FIG. 2 of the drawings, the above mentioned sound information sections or blocks are shown shaded with down-to-the-right hatching and are designated by 30g. The area shown enclosed by these sound information sections or blocks 30g are thus composed of the picture information sections or blocks into which the picture information to be reproduced on the display screen is to be inserted. The sound information sections or blocks 30g partially overlap portions of the above mentioned area 30e to actually appear on the video display screen of a monitoring television receiver. The pieces of information to be introduced into these portions of the area 30e may be clamped at a certain level to blank out the images which would otherwise appear on the particular portions of the display screen or may be substituted by suitable picture or letter information supplied from an external source such as a computer (not shown) as will be described in more detail.

Figure 3A:
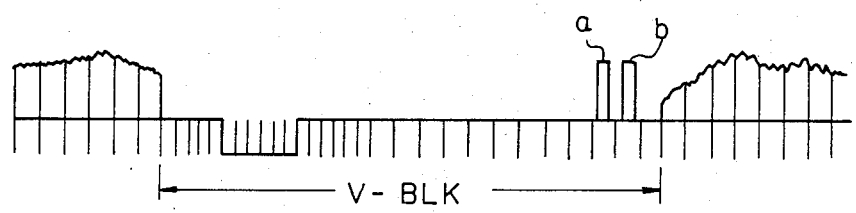
FIGS. 3A and 3B are views which show examples of the waveform of a video format signal used in an information recording and reproducing method according to the present invention.
Figure 3B:
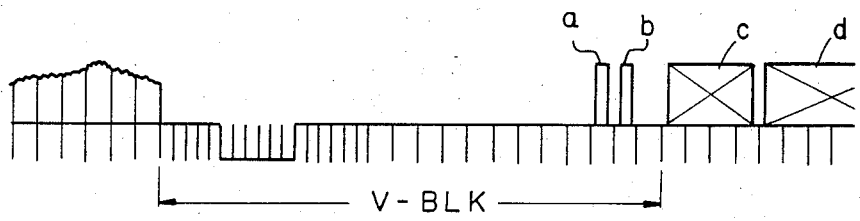

FIGS. 3A and 3B show examples of the waveform of the video format signal to be recorded on a video disc in carrying out an information recording and reproducing method according to the present invention, wherein a vertical blanking period is denoted by "V-BLK". The video format signal under consideration is assumed to be of the NTSC (National Television Systems Committee) system by way of example but may apparently be of another system such as the PAL (Phase Alteration by Line) system. The waveform shown in FIG. 3A contains no sound information while the waveform shown in FIG. 3B has such information contained therein. Indicated at a and b in FIGS. 3A and 3B are test signals such as the signals for color bars of a standardized television testing pattern and indicated by c and d in FIG. 3B are picture and sound information signals, respectively. The control and sound information in the waveforms herein shown assumed to be entrained on the horizontal blanking pulses alone by way of example and are thus not contained in the vertical blanking pulses. If desired, however, the waveform of the video format signal used in a method according to the present invention may be produced in such a manner as to contain such information not only in the horizontal blanking pulses but in the vertical blanking pulses thereof or in the horizontal blanking pulses alone. In whichever case, it is important that those pieces of control information which appertain to the locations at which the pieces of sound information are to be inserted in the waveform and the manners in which the picture information is to be processed be inserted into the waveform at locations anterior to the picture information associated with the particular control information. There may be cases where the pieces of sound information are inserted into a plurality of successive frames. In these cases, the control information related to these pieces of sound information may be introduced into the control information zone or block of only the foremost one of these successive frames or, where necessary, may be introduced into the control information zone or block of not only the foremost frame but also any one or more of the subsequent frames.

Figure 4:
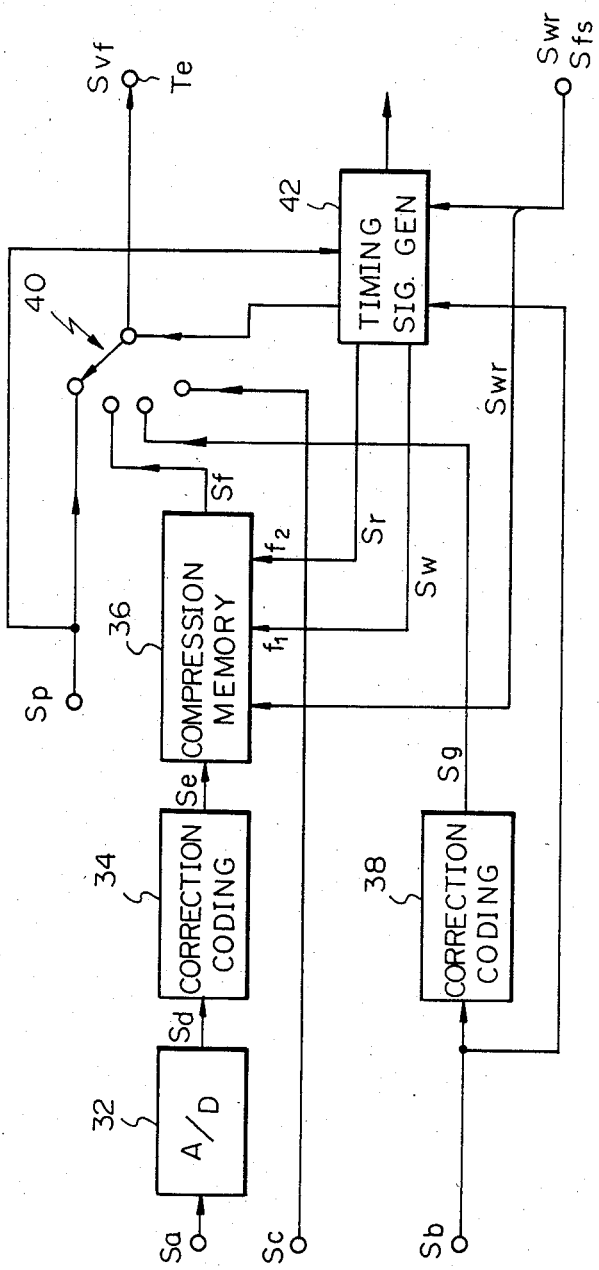
FIG. 4 is a block diagram showing a preferred example of the circuit arrangement of a signal encoder network which is used in an information recording and reproducing method according to the present invention.

FIG. 4 of the drawings shows a preferred example of an information encoder network adapted to produce the video format signal in a method according to the present invention. The information encoder network comprises an analog-to-digital converter (A/D) 32 operative to convert a supplied analog sound information signal into a series of corresponding digital signals Sd. The analog-to-digital converter 32 herein used is of the nature adapted to provide a relatively high signal compression ratio through, for example, adaptive delta modulation (ADM) or adaptive differential pulse-code modulation (ADPCM). The analog-to-digital converter 32 has an output terminal connected to the input terminal of a first error correction coding circuit 34. The first error correction coding circuit 34 is adapted to convert the input digital signals Sd into suitable error correction coded digital signals Se and is operative to interleave or re-arrange the output signals Sd from the analog-to-digital converter 32 and to add suitable redundant codes to the digital signals thus interleaved or re-arranged in sequence. Each of the redundant codes are composed of one or more redundant bits and is added to the interleaved digital signals allocated to each of the sound information sections or blocks 30g of the display area 30 (FIG. 2). As well known in the art, interleaving of digital signals is conducive to time axially dispersing the errors that might probably be produced in a series of digital signals when it happens that a dropout of information takes place in the presence of, for example, a scratch or a hair on the surface of the video disc during playback of the disc. The digital signals Se coded for error correction as above described are registered with a predetermined write-in sampling frequency $f_1$ in a time-axis compression memory unit 36 having an input terminal connected to the output terminal of the error correction coding circuit 34. The error correction coded digital signals Se thus registered in the time-axis compression memory unit 36 are read out with a predetermined read-out sampling frequency $f_2$ higher than the above mentioned write-in sampling frequency $f_1$ and are in this fashion compressed in terms of time. The time-axis compression memory unit 36 is thus adapted to deliver from its output terminal a train of error correction coded and time axially compressed digital sound information signals Sf with the read-out sampling frequency $f_2$.

The control signals contained in the video format signal used in a method according to the present invention are broken down to two different categories. The signals which fall within one of these categories are those which are of critical importance in the playback system and which thus call for precise and reliable detection and correction of errors. The control signals belonging to this category are designated by Sb in FIG. 4 and are fed to a second error correction coding circuit 38. Examples of these control signals Sb include the signals indicative of the numbers allocated to those sections or blocks 30g of the display area 30 (FIG. 2)

into which the sound information is to be inserted, the signals indicative of the numbers allocated to the sound reproducing channels such as the monaural and stereophonic sound reproducing channels, the signals to dictate the playback operation of the video disc player, and the signals to dictate the continuous playback or intermittent playback of the sound information. Where the sound information sections or blocks 30g are broken down to a certain number of groups, the control signals Sb of the first category may further include those which are used to indicate the numbers allocated to such groups of the sections or blocks 30g. Similarly to the first error correction coding circuit 34, the above mentioned second error correction coding circuit 38 is adapted to convert the input digital signals Sb into suitable error correction coded digital signals Sg. The second error correction coding circuit 38 is thus operative to re-arrange or interleave the control signals Sb and to add redundant codes to the interleaved signals allocated to the control information zone or block 30f of the display area 30 (FIGS. 1 and 2). In view of the critical importance of the control information in the playback, it is desired that the error correction coded signals Sb to be produced by the second error correction coding circuit 38 be immune to error than the error correction coded signals Se to be produced by the first error correction coding circuit 34. The control signals which fall within the other of the above mentioned two categories are those which are of less importance in the playback system and which will not require strict detection and correction of errors. These control signals are designated by Sc in FIG. 4 and may include the flag signals indicative of the presence and absence of sound information in the individual fields or frames, and the Philips or halt codes which, when reproduced, are to produce a still playback mode automatically in the video disc player.

The modified sound information and control signals Sf and Sg and the unmodified control signals Sc as above described as well as the composite picture signals Sp are fed to an output terminal $T_e$ of the signal encoder network selectively through a switch circuit 40. The switch circuit 40 comprises four input terminals and a movable contact element connected to the output terminal $T_e$ of the encoder network and pivotally movable for connection selectively to any one of the four input terminals. The input terminals of the switch circuit 40 consist of a first input terminal connected to the source of the composite picture signals Sp, a second input terminal connected to the output terminal of the time-axis compression memory unit 36, a third input terminal connected to the output terminal of the second error correction coding circuit 38, and a fourth input terminal connected to the source of the unmodified control signals Sc. The composite picture signals Sp thus supplied to the switch circuit 40 are representative of the pieces of picture information to be reproduced and are herein assumed to contain synchronizing pulses therein. The picture signals Sp are supplied not only to the first input terminal of the switch circuit 40 but to a timing signal generator 42 having incorporated therein an oscillator responsive to the synchronizing pulses contained in the signals Sp. The timing signal generator 42 is further responsive to write-in and read-out shift signals Swr and field or frame selection signals Sfs supplied from suitable external signal sources (not shown) and is operative to produce clock signals including write-in control signals Sw with the above mentioned write-in sampling frequency $f_1$ and rear-out control signals Sr with the above mentioned read-out sampling frequency $f_2$. The timing signal generator 42 is preferably further responsive to the control signals Sb of the above mentioned first category.

The write-in and rear-out shift signals Swr are also fed to the time-axis compression memory unit 36 and control the memory unit 36 to write therein the digital output signals Se from the first error correction coding circuit 34 or to read out the information thus registered therein. The write-in and read-out control signals Sw and Sr produced by the timing signal generator 42 are selectively supplied to the memory unit 36 and enable the memory unit 36 to write the information supplied from the coding circuit 34 therein at the predetermined write-in sampling frequency $f_1$ or to read out the thus written information at the predetermined read-out sampling frequency $f_2$. Thus, the time-axis compression memory unit 36 delivers from the output terminal thereof the previously mentioned error correction coded and time axially compressed digital sound information signals Sf in response to the read-out control signals Sr. The timing signal generator 42 is further operative to deliver a train of switch actuating signals Ss to the switching circuit 40 and actuates the movable contact element thereof to successively connect to the four input terminals of the switch circuit 40 at a frequency dictated by the actuating signals Ss. The composite picture signals Sp, error correction coded and time axially compressed sound information signals Sf, error correction coded control signals Sg and unmodified control signals Sc are in this fashion passed in succession through the first, second, third and fourth input terminals, respectively, of the switch circuit 40 and are delivered as a video format signal Svf from output terminal $T_e$ of the information encoder network. The modified and unmodified control signals Sg and Sc are inserted into the control information zone or block 30f of the display area 30 shown in FIGS. 1 and 2. The modified sound information signals Sf are inserted into the sound information sections or blocks 30g of the display area 30 while the composite picture signals Sp are inserted into the remaining sections or blocks of the display area 30. The video format signal Svf thus produced by the information encoder network described with reference to FIG. 4 is recorded on a recording medium such as a video disc and is decoded during playback of the video disc by means of an information decoder network a preferred example of which is illustrated in FIG. 5 of the drawings.

Figure 5:
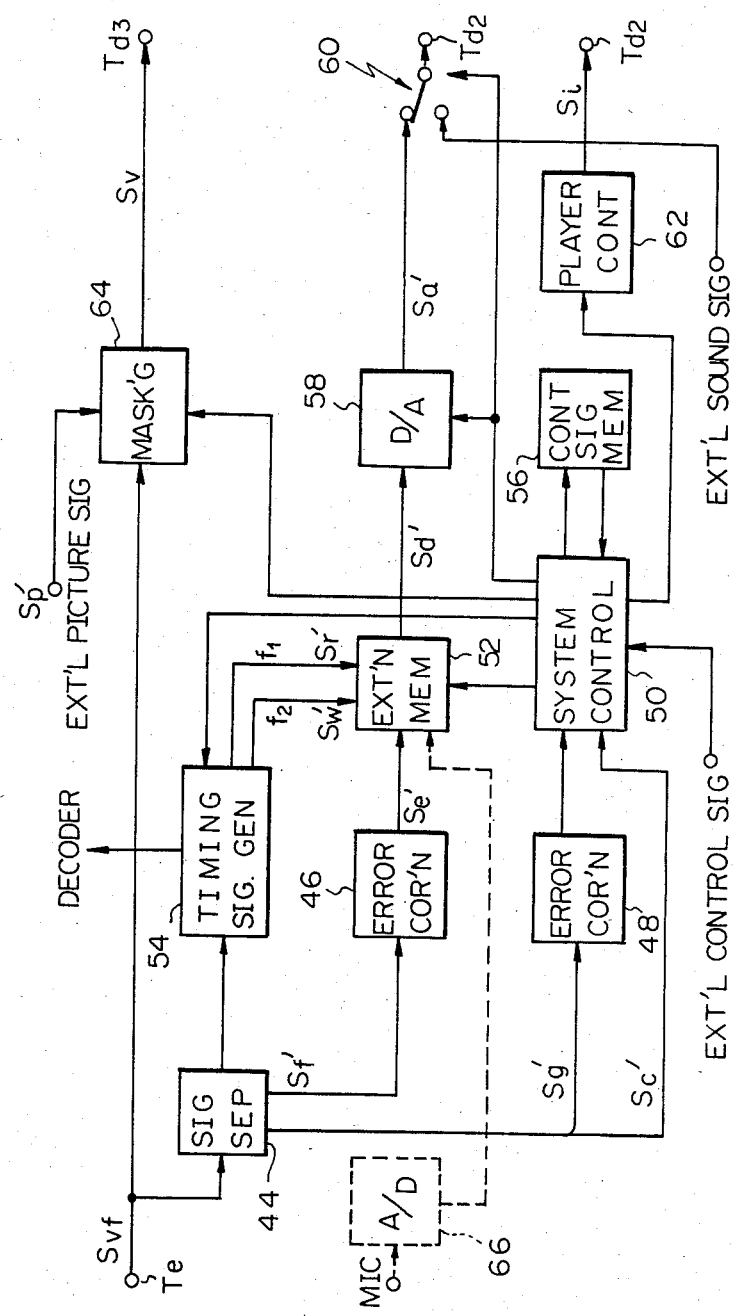
FIG. 5 is a block diagram showing a preferred example of the circuit arrangement of an information decoder network which is to be used in combination with the information encoder network illustrated in FIG. 3.

Referring to FIG. 5, the information decoder network also forms part of a system to carry out an information recording and reproducing method according to the present invention and comprises a signal separation circuit 44 responsive to the video format signal Svf delivered from the above described information encoder network. The signal separation circuit 44 is operative to separate the supplied video format signal Svf into sound information signals Sf' and first and second control signals Sg' and Sc'. The sound information signals Sf' correspond to the error correction coded, time axially compressed digital signals Sf supplied from the time-axis compression memory unit 36 of the information encoder network. The control signals Sg' correspond to the error correction coded control signals Sg supplied from the second error correction coding circuit 38 of the encoder network, while the control signals Sb' correspond to the control signals Sc of the previously mentioned second category. The sound information signals Sf' thus extracted from the video format signal Svf by means of the signal separation circuit 44 are supplied to a first error correction circuit 46 for being de-interleaved and cleared of errors contained, if any, therein. Likewise, the first control signals Sg' extracted from the video format signal Svf are supplied to a second error correction circuit 48 for correcting the errors contained, if any, therein. The second control signals Sc' are fed to a system control circuit 12.

The sound information signals Sf' cleared of errors by the first error correction circuit 46 are fed to and written into a time-axis extension memory unit 52 with a predetermined write-in sampling frequency. The sound information registered in the time-axis extension memory unit 52 is read out therefrom at a predetermined read-out sampling frequency lower than the above mentioned write-in sampling frequency and are in this fashion extended in terms of time. The write-in and read-out sampling frequencies predetermined for the time-axis extension memory unit 52 are equal to the read-out and write-in sampling frequencies $f_2$ and $f_1$, respectively, predetermined for the time-axis compression memory unit 36 of the information encoder network shown in FIG. 4. The time-axis extension memory unit 52 of the information decoder network is thus adapted to deliver from its output terminal a train of digital signals Sd' which correspond to the digital sound information signals Sd supplied from the analog-to-digital converter 32 of the encoder network shown in FIG. 4. The sampling frequencies $f_2$ and $f_1$ which dictate the timings at which pieces of information are written into and read out from the time-axis extension memory unit 52 are generated by a timing signal generator 54 having incorporated therein an oscillator responsive to the synchronizing pulses extracted from the composite picture signals Sp contained in the video format signal Svf supplied to the above mentioned signal separation circuit 44. The timing signal generator 54 is operative to produce clock signals including write-in control signals Sw' with the above mentioned sampling frequency $f_2$ and rear-out control signals Sr' with the above mentioned read-out sampling frequency $f_1$. The write-in and read-out control signals Sw' and Sr' produced by the timing signal generator 54 are selectively supplied to the memory unit 52 and enable the memory unit 52 to write the information from the first error correction circuit 46 therein at the write-in sampling frequency $f_2$ or to read out the thus written information at the read-out sampling frequency $f_1$. The memory unit 52 is actuated to read out the information registered therein at a timing determined by a signal supplied from the above mentioned system control circuit 50. For this purpose, the system control circuit 50 has an input terminal connected to a control signal memory circuit 56 having stored or registered therein signals to dictate the timings at which the time-axis extension memory unit 52 is to be actuated to read out the information registered therein. If desired, the digital sound information signals Sf' supplied from the signal separation circuit 44 may be supplied directly to the time-axis extension memory unit 52 so as to effect correction of the signals Sf' when the signals Sf' are being extended in terms of time during reading of the information registered in the memory unit 52. The pieces of information thus read out by the time-axis extension memory unit 52, viz., the above mentioned digital output signals Sd' from the memory unit 52 are fed to a digital-to-analog converter 58 and are converted into an analog sound information signal Sa' which corresponds to the original sound information signal Sa described with reference to FIG. 4. The digital-to-analog converter 58 has a control terminal connected to the system control circuit 50. The analog sound information signal Sa' thus delivered from the output terminal of the digital-to-analog converter 58 is supplied to an output terminal $T_{d1}$ of the information decoder network through a switch circuit 60 having a movable contact element controlled by a signal supplied from the system control circuit 50. The switch circuit 60 has two input terminals consisting of a first input terminal connected to the output terminal of the digital-to-analog converter 58 and a second input terminal connected to an external source (not shown) of a suitable sound signal Sh. The contact element of the switch circuit 60 is actuated to connect to the second input terminal in the absence of the sound information signal Sa' at the output terminal of the digital-to-analog converter 58 or when the contact element is caused to connect to the second input terminal by a signal supplied from the system control circuit 50 in the presence of the signal Sa' at the output terminal of the digital-to-analog converter 58. Either the sound information signal Sa' or the sound signal Sh is thus passed through the switch circuit 60 to the output terminal $T_{d2}$ of the information decoder network. An example of the above mentioned sound signal Sh is the frequency modulated two-channel sound signal to be produced in a video disc player.

On the other hand, the first control signals Sg' extracted from the video format signal Svf in the signal separation circuit 44 and corrected by the second error correction circuit 48 as previously described are supplied to the system control circuit 12, together with the second control signals Sc' which are also extracted from the video format signal Svf in the signal separation circuit 44. In response to the first and second control signals Sg' and Sc', the system control circuit 50 produces control signals Si to control the playback operation of the video disc player. The playback control signals Si are fed to another output terminal $T_{d2}$ of the decoder network through a player control circuit 62.

The video format signal Svf delivered from the information encoder network shown in FIG. 4 is supplied not only to the signal separation circuit 44 as described above but also to a sound signal substituting or masking circuit 64. The sound signal substituting or masking circuit 64 is further supplied with control signals from the system control circuit and picture signals Sp' from an external source such as a computer (not shown). The pieces of sound information contained in the video format signal Svf are thus substituted by such picture signals Sp' or clamped at a suitable fixed level such as, for example, the blanking level or the average picture level (APL) of the video format signal Svf in the signal substituting or masking circuit 64. The resultant picture information signal Sv is supplied from the output terminal of the mixing or masking circuit 56 to a third output terminal $T_{d3}$ of the information decoder network.

Where the video disc player to incorporate therein the features provided by the present invention is of the type having a language laboratory function, the information decoder network shown in FIG. 5 may further comprise an analog-to-digital converter 66 having an input terminal connected to the output terminal of a microphone (not shown). The analog sound signals supplied from the microphone are converted into digital sound signals S1 by the analog-to-digital converter 66 and the digital sound signals thus produced are fed to the time-axis extension memory unit 52 at the previously mentioned write-in sampling frequency $f_2$. The student's pronunciation represented by the sound information supplied from the microphone can thus be compared with the recorded pronunciation represented by the sound information contained in the video format signal Svf when the sound signals S1 thus written into the time-axis extension memory unit 52 are read out with the previously mentioned read-out sampling frequency $f_1$.

In order to utilize the information transmission medium efficiently, it is desired that the write-in sampling frequency $f_1$ of the time-axis compression memory unit 36 of the information encoder network shown in FIG. 4 and the read-out frequency $f_1$ of the time-axis extension memory unit 52 of the information decoder network shown in FIG. 5 be made variable depending upon the nature of the sound information to be reproduced. As well known in the art, the theory of sampling teaches that a sampling frequency should be twice or more higher than the signal frequency band. If the sound information to be reproduced is an instrumental music and has a relatively broad frequency band, it is thus advisable that the signals representative of such sound information be sampled with relatively high frequencies. If, on the other hand, the sound information is a vocal sound, the signals representative of the sound information may be sampled with relatively low frequencies. It is for these reasons preferable that the control information to form part of the video format signal Svf used in an information recording and reproducing method according to the present invention be produced in such a manner as to contain pieces of information effective to specify sampling frequencies depending upon the natures of the sound information to be reproduced. In view, in this instance, of the fact that the musical information to be reproduced is usually stereophonic (with two sound reproducing channels) and the vocal information is usually monaural (with a single sound reproducing channel), it will be further preferable that the control information in the video format signal Svf contains pieces of information effective to specify the number of the sound reproducing channels to be put into play. Thus, the control information contained in the video format signal Svf used in a method according to the present invention preferably contains pieces of information to specify the sampling frequencies $f_1$ and $f_2$ of the time-axis compression and extension memory modules 36 and 52 and pieces of information to specify the number of the sound reproducing channels.

Figure 6:
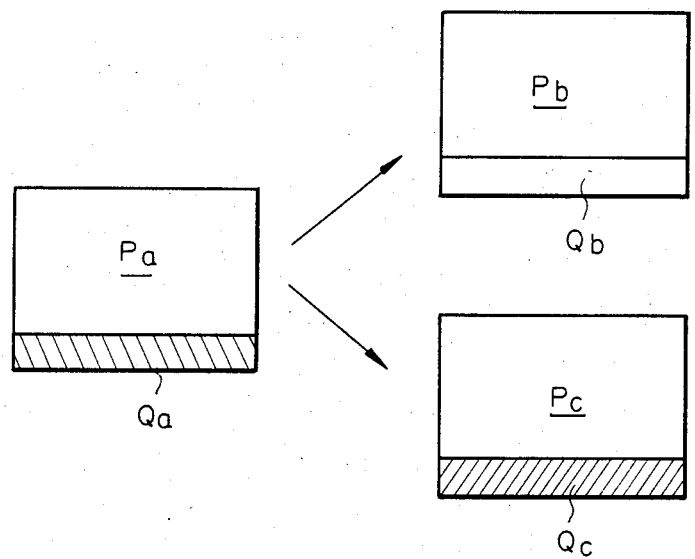
FIG. 6 is a schematic view showing an example of the principle on which the sound signal substituting or masking circuit forming part of the decoder network shown in FIG. 5 is to operate during playback operation of a video disc player.

FIG. 6 of the drawings shows the principles on which the sound signal substituting or masking circuit 64 provided in the information decoder network shown in FIG. 5 is to operate. Designated by Ps a picture which would result from the video format signal Svf containing sound information therein. When the pieces of sound information contained in the video format signal Svf are inserted into the sound information sections or blocks of, for example, the lowermost row of the picture zone, a picture Qa will appear in the particular sections or blocks of the picture zone as the reproduction of the sound information. Actually, the video format signal Svf is supplied to the sound signal substituting or masking circuit 64 before the video format signal Svf is reproduced, and the pieces of sound information contained therein are either substituted by the picture signals Sp' supplied from an external source such as a computer or are clamped at a certain level such as the blanking level or the average picture level of the video format signal Svf by a control signal supplied from the system control circuit 50 (FIG. 5) as previously described. The picture signals Sp' from the external source are reproduced as a picture Qb in the sound information sections or blocks of the picture zone. When the pieces of sound information in the video format signal Svf are clamped at the blanking level of the video format signal Svf, the sound information sections or blocks of the picture zone are blanked out as indicated at Qc. Where the video disc player is used as part of an educational system or otherwise for educational or training purposes, the picture signals Sp' to be reproduced as the picture Qb may be representative of letters, characters, numerals and/or graphic signs indicating instructions, questions, answers or other messages responsive to those entered into the system or a computer (not shown) coupled to the system by the student or viewer of the video disc player. To facilitate substitution of the picture information from an external source for the sound information in the video format signal Svf, all the fields or frames containing sound information may be coded with reference signals or flags indicative of the presence of such information. Through detection of these reference signals or flags, the pieces of sound information contained in the fields or frames can be easily replaced with the picture information from the external source without respect to the nature of the video format signal Svf and the conditions in which the system is operating.

Figure 7:
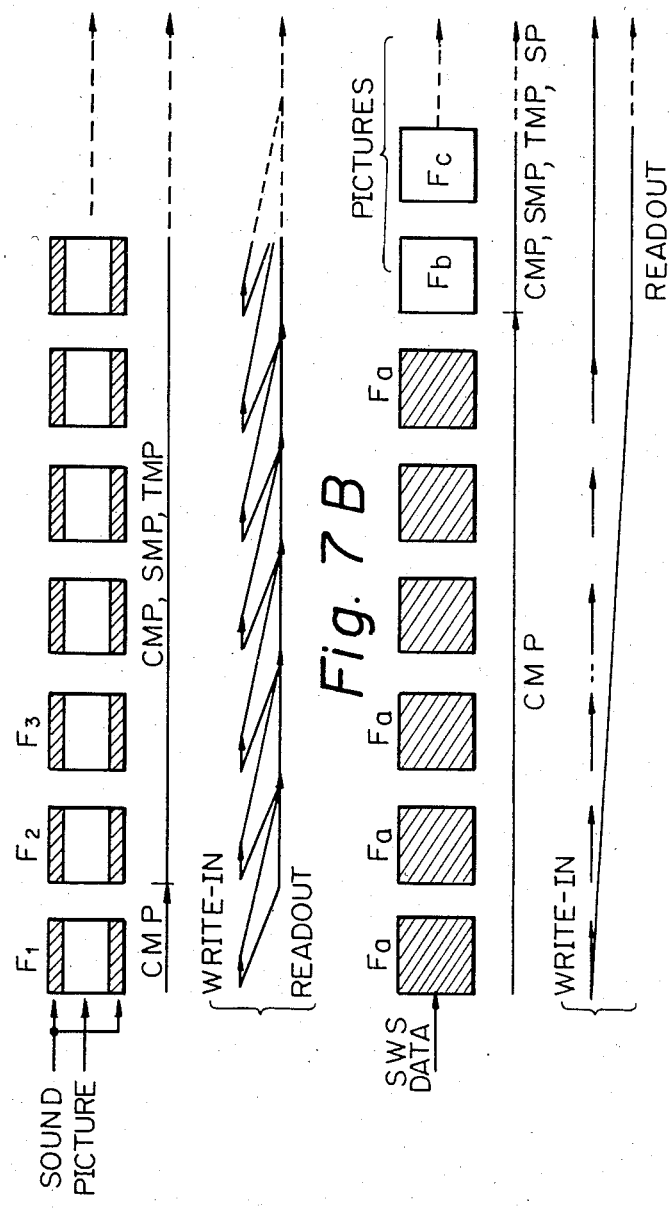
FIGS. 7A and 7B are schematic views showing two different preferred examples of the method of reproducing picture and sound information in a "still-picture-with-sound" (SWS) mode in an information recording and reproducing method according to the present invention or, more specifically, two different examples of the relationship between the manner in which picture and sound information signals are inserted into fields or frames and the manner in which picture information signals are to be reproduced on a picture area when the picture information and sound information signals are to be reproduced in the still-picture-with-sound mode in a system according to the present invention.

FIGS. 7A and 7B of the drawings show two different preferred examples of a method of reproducing picture and sound information in a "still-picture-with-sound" (SWS) mode in an information recording and reproducing method according to the present invention. More specifically, FIGS. 7A and 7B show two different examples of the relationship between the manner in which SWS sound information is to be inserted into fields or frames and the manner in which picture information is to be reproduced in the still-picture-with-sound mode on the picture zone of the display area 30 shown in FIGS. 1 and 2 in a method according to the present invention. In the method of reproducing SWS picture and sound information as shown in FIG. 7A, both the SWS picture information and sound information are inserted into all the successive fields or frames. For this purpose, the information encoder network described with reference to FIG. 4 is constructed and arranged so that SWS sound information is recorded on the video disc in such a manner that the signals are to be inserted into the SWS sound information sections or blocks of, for example, the uppermost and lowermost rows in the picture zone. On the other hand, the information decoder network described with reference to FIG. 5 is constructed and arranged so that, while the SWS picture information in a certain field or frame is being reproduced, the SWS sound information associated with the SWS picture information to be reproduced in the immediately subsequent field or frame is registered in the time-axis extension memory unit 52 and the SWS sound information registered in the memory unit 52 in the immediately preceding field or frame is time axially extended and read out from the memory unit 52. In this instance, the time-axis extension memory unit 52 has two memory areas so that the SWS sound information associated with the SWS picture information to be reproduced in the successive fields or frames is registered alternately in the two memory areas of the time-axis extension memory unit 52 or, in other words, the SWS sound information in a certain field or frame is registered in one of the two memory areas and the SWS sound information in the immediately subsequent field or frame is registered in the other memory area. Thus, while the SWS picture information in a first field or frame denoted by $F_1$ in FIG. 7A is being reproduced, the SWS sound information associated with the SWS picture information to be reproduced in the immediately subsequent or second field or frame $F_2$ is registered in a first memory area of the time-axis extension memory unit 52. The SWS sound information registered in the first area of the time-axis extension memory unit 52 is time axially extended and read out from the memory unit 52 while the SWS picture information in the second field or frame $F_2$ is being reproduced. While the SWS picture information in the second field or frame $F_2$ is being reproduced and the SWS sound information in the first field or frame $F_1$ is being time axially extended and read out from the first memory area of the memory unit 52, the SWS sound information in the second field or frame $F_2$, viz., the SWS sound information associated with the SWS picture information to be reproduced in a third field or frame $F_3$ is registered in a second memory area of the memory unit 52. Upon completion of the readout of the SWS sound information in the first field or frame $F_1$ from the first memory area of the memory unit 52, the SWS sound information in the second field or frame $F_2$ is time axially extended and read out from the second memory area of the memory unit 52 while the SWS picture information in the third field or frame denoted by $F_3$ is being reproduced. While the SWS picture information in the third field or frame $F_3$ is being thus reproduced, the SWS sound information in the third field or frame $F_3$ is registered in the above mentioned first memory area of the memory unit 52 and the SWS sound information registered in the second memory area of the memory unit 52 is time axially extended and read out. By repetition of these cycles, the pieces of SWS picture information in the successive fields or frames and the pieces of SWS sound information respectively associated with these pieces of SWS picture information are reproduced on a real time basis. Of the fields or frames reproduced in the above described manner, the SWS picture information in the first field or frame $F_1$ is reproduced in an ordinary continuous motion picture mode (CMP) but the SWS picture information in the successive fields or frames following the first field or frame can be reproduced either in the ordinary continuous motion picture mode or in a slow motion picture mode (SMP) or a stepped motion picture mode (TMP) since each of the fields or frames has a time duration equal to the time duration of the SWS sound information in each field or frame. Because, in this instance, of the fact that the pieces of SWS sound information in the successive fields or frames can be registered alternately in the two memory areas of the memory unit 52 and because the pieces of SWS sound information in each field or frame can be registered partially in one of the two memory areas and partially in the other memory area, the storage capacity of the time-axis extension memory unit 52 may be less than the amount of sound information in two fields or frames.

In the method of reproducing picture and sound information as shown in FIG. 7B, SWS sound information is inserted into a predetermined number of successive fields or frames $F_a$ throughout the area of each field or frame, and SWS picture information is inserted into a predetermined number of successive fields or frames $F_b$ subsequent to the fields or frames $F_a$. The SWS sound information in the preceding series of fields or frames $F_a$ is registered successively in the time-axis extension memory unit 52 of the information decoder network of FIG. 5 with the video disc player set in the ordinary continuous motion picture mode (CMP) thereof. Upon completion of the write-in of SWS sound information in the last one of these fields or frames $F_a$, the SWS picture information inserted in the subsequent series of fields or frames $F_b$ is reproduced. While the SWS picture information in the fields or frames $F_b$ is being thus reproduced, the SWS sound information registered in the time-axis extension memory unit 52 is time axially extended and read out successively until the pieces of SWS picture information in all the fields or frames $F_b$ are reproduced. The fields or frames $F_b$ reproduced in this manner may be used to produce ordinary continuous motion pictures, slow motion pictures or stepped motion pictures as the case may be. It will be apparent that although it has been described and shown that SWS sound information is inserted into each of the fields or frames $F_a$ throughout the area of the field or frame, the SWS sound information may be inserted only into the SWS sound information sections or blocks of the uppermost and lowermost rows in the picture zone as in the method of information reproduction as shown in FIG. 7A. The method of information reproduction as shown in FIG. 7B has a disadvantage that the time-axis extension memory unit 52 is required to register all the pieces of SWS sound information in the successive fields or frames Fa and to have a storage capacity larger than that of the memory unit 52 used to carry out the method of information reproduction as shown in FIG. 7A. When the SWS picture information is to be reproduced to produce still pictures, however, a larger number of still pictures can be recorded in the method of information reproduction as shown in FIG. 7B than in the method of information reproduction as shown in FIG. 7A since it is required in the method shown in FIG. 7A to stepwise produce a number of pictures for forming a single still picture due to the relatively short durations of the SWS sound information allocated to the individual fields or frames. The method of information reproduction as shown in FIG. 7B is thus advantageous over the method of information reproduction as shown in FIG. 7A in that a larger number of still pictures can be recorded, although the time-axis extension memory unit 52 used for the former method must be larger in capacity than the memory unit 52 used to carry out the latter method.

The video disc player is thus operable in a variety of modes through selection of the relationship between the manner in which the picture zone of the display area 30 (FIGS. 1 and 2) is to be used and the manner in which the SWS sound information for the still-picture-with-sound operation is to be inserted into fields or frames. When it is desired that the information decoder network shown in FIG. 5 be used for selectively providing the methods of reproducing picture and sound information as shown in FIGS. 7A and 7B, the time-axis extension memory unit 52 of the decoder network is required to shift between two conditions respectively adapted to produce the two methods. Thus, the time-axis extension memory unit 52 of the decoder network must be supplied with different signals, some of which are to control the memory unit 52 for registering and reading SWS sound information when the method of information reproduction as shown in FIG. 7A is selected and the others of which are to control the memory unit 52 for registering and reading SWS sound information when the method of information reproduction as shown in FIG. 7B is selected. These signals are contained in the control information to be inserted into the control information zone 30f of the display area 30 shown in FIGS. 1 and 2. The control information to be inserted into the control information zone 30f further include those which are to select one of the slow motion picture mode (SMP), stepped motion picture mode (TMP) and still picture mode (SP).

Figure 8:
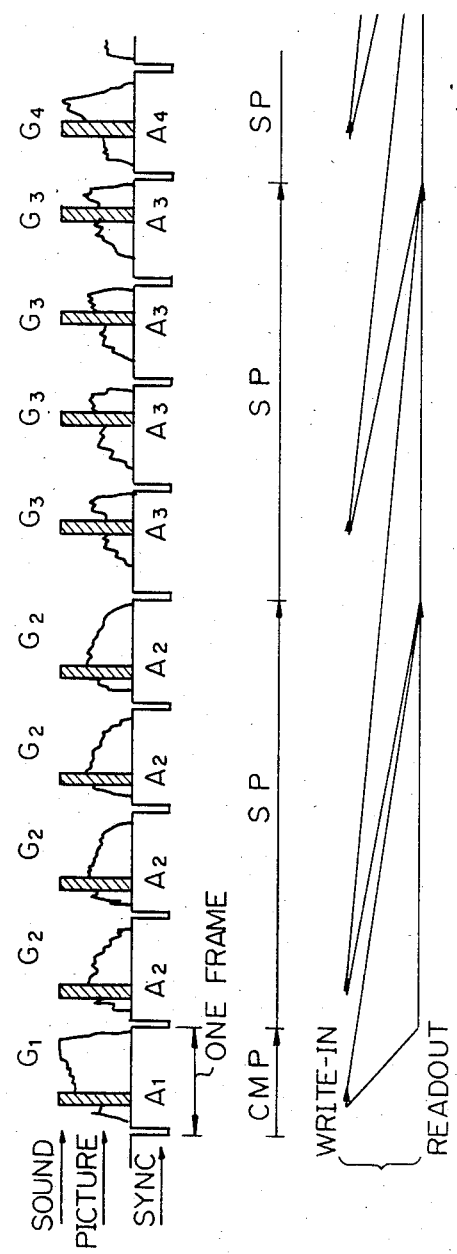
FIG. 8 is a view similar to FIGS. 7A and 7B but shows a modified version of the method of reproducing picture and sound information in the still-picture-with-sound mode as shown in FIG. 7A.

FIG. 8 of the drawings shows a modified version of an information recording and reproducing method according to the present invention as above described with reference to FIG. 7A. In the method of information reproduction as herein shown, the SWS picture information in a first field or frame denoted by $G_1$ is reproduced in an ordinary continuous motion picture mode (CMP) and the fields or frames subsequent to the first field or frame are broken down to a succession of groups each consisting of a predetermined number of successive fields or frames. The SWS picture information in the fields or frames thus grouped is reproduced in such a manner that the pieces of SWS picture information in the series of fields or frames (denoted by $G_2$) following the first field or frame $G_1$ are stepwise reproduced to produce a single still picture and the pieces of SWS picture information in the series of fields or frames (denoted by $G_3$) subsequent to the series of fields or frames $G_2$ are stepwise reproduced to produce another still picture. The pieces of SWS sound information (denoted by $A_1$) associated with the SWS picture information in the series of fields or frames $G_2$ following the first field or frame $G_1$ are registered in a first memory area of the time-axis extension memory unit 52 of the information decoder network while the SWS picture information in the first field or frame $G_1$ is being reproduced. Upon completion of the reproduction of the SWS picture information in the first field or frame $G_1$, the SWS sound information (denoted by $A_2$) associated with the SWS picture information in the series of fields or frames $G_3$ is registered in a second memory area of the time-axis extension memory unit 52 during reproduction of the SWS picture information in, for example, the foremost one of the series of fields or frames $G_2$. The SWS sound information $A_1$ registered during reproduction of the SWS picture information in the first field or frame $G_1$ time axially extended and read out from the memory unit 52 as the SWS picture information in the series of fields or frames $G_2$ is being thus reproduced. When the readout of the SWS sound information $A_1$ registered in the time-axis extension memory unit 52 is complete, the SWS sound information (denoted by $A_3$) associated with the SWS picture information in the series of fields or frames subsequent to the series of fields or frames $G_3$ is registered in the above mentioned first memory area of the memory unit 52 during reproduction of the SWS picture information in, for example, the foremost one of the fields or frames $G_3$. In this fashion, the SWS sound information associated with the SWS picture information in a certain group of successive fields or frames is registered in the time-axis extension memory unit 52 during reproduction of the SWS picture information in the foremost one of the fields or frames of the immediately preceding group.

The number of the fields or frames of each group is predetermined depending upon the number of the fields or frames which can be associated with the SWS sound information to be registered in a single field or frame. The SWS sound information contained in the fields or frames of each group is thus registered in the time-axis extension memory unit 52 during reproduction of the SWS picture information in one of the fields or frames of the particular group and is read out therefrom continuously throughout the fields or frames of the subsequent group. The SWS sound information registered in one of the fields or frames a group is thus associated with the pieces of SWS picture information in the fields or frames of the subsequent group. If, for this reason, the time-axis extension memory unit 52 is designed in such a manner as to have a storage capacity for registering pieces of SWS sound information to be inserted into two fields or frames, the SWS sound information in the fields or frames of each group can be inserted into any one of these fields or frames. In this instance, the readout of the SWS sound information associated with the SWS picture information in the fields or frames of each group can be commenced simultaneously when the readout of the SWS sound information associated with the SWS picture information in the fields or frames of the immediately preceding group is terminated and, in this fashion, the pieces of SWS sound information in the fields or frames of successive groups can be reproduced continuously through consecutive fields or frames. While the SWS sound information is being thus reproduced continuously, the SWS picture information in the fields or frames of each group is reproduced as a still picture and, as a consequence, the pieces of SWS picture information in the fields or frames of successive groups are reproduced as a series of stepped motion pictures.

The information supplied from the video disc player is inoperable for discriminating the stepped motion picture mode (TMP) from the ordinary continuous motion picture mode (CMP). If such information is fed to the information decoder network of FIG. 5 without being backed up by any subsidiary information, the decoder network would determine that the ordinary continuous motion picture mode (CMP) is to be continued. If this takes place when the information decoder network is set for the mode of operation described with reference to FIG. 8, viz., the still-picture-with-sound mode, the pieces of SWS sound information in all of the fields or frames of each of the groups would be registered repeatedly in the time-axis extension memory unit 52 of the information decoder network. In order to avoid such improper operation of the decoder network, the control information used in an information recording and reproducing method according to the present invention contains such pieces of information that are effective to discriminate between the SWS sound information in each field or frame and the SWS sound information in the immediately preceding field or frame.

Where there are available two or more sound reproducing channels, the pieces of SWS sound information for such sound reproducing channels are muliplexed in a data block so that the SWS sound information for each of the channels is associated with the pieces of SWS picture information in the fields or frames of each group. In this instance, there holds the relationship $$N_d = N_c \cdot N_f f_1 / f_F$$

among the number $N_d$ of SWS sound data multiplexed in each of the data blocks, the number $N_c$ of the sound reproducing channels available, the number $N_F$ of the fields or frames with which the SWS sound data in each data block, the read-out sampling frequency $f_1$ of the time-axis extension memory unit 52 of the information decoder network shown in FIG. 5, and the field or frame frequency $f_F$.

Figure 9:
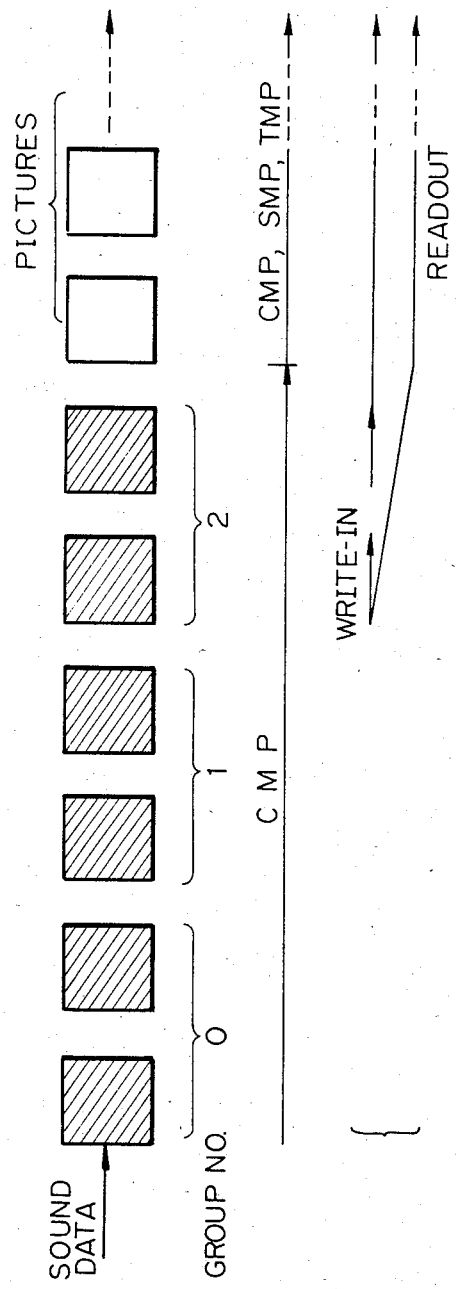
FIG. 9 is a view also similar to FIGS. 7A and 7B but shows another preferred example of a method of reproducing picture and sound information in the still-picture-with-sound mode in accordance with the present invention.

FIG. 9 of the drawings shows another preferred example of an information recording and reproducing method according to the present invention, viz., another example of the relationship between the manner in which sound information is to be inserted into fields or frames and the manner in which picture information is to be reproduced on the picture zone of the display area 30 shown in FIGS. 1 and 2 in a method according to the present invention. The example herein shown of such a relationship is adapted to reproduce the picture and sound information also in the still-picture-with-sound mode (SWS). To carry out the mode of operation shown in FIG. 9, the fields or frames into which the SWS sound information is to be inserted are broken down to a plurality of groups and different identification numbers are allocated to the individual groups of the fields or frames so as to produce a series of significant pieces of SWS sound information in one group and another series of significant pieces of SWS sound information in another group. In FIG. 9, the fields or frames are shown including three successive groups of fields or frames consisting of a first group of fields or frames designated by number 0, a second group of fields or frames immediately subsequent to the group 0 and designated by number 1 and a third group of fields or frames immediately subsequent to the group 0 and designated by number 2. By way of example, it is herein assumed that these first, second and third groups thus designated by the identification numbers 0, 1 and 2 are used for the reproduction of SWS sound information in the English, German and French languages, respectively. A suitable number of fields or frames subsequent to the third group of fields or frames are assumed to be used for the reproduction of SWS picture information alone. The identification numbers 0, 1 and 2 thus allocated to the first, second and third groups of fields or frames are represented by some of the pieces of information contained in the control signals used in an information recording and reproducing method according to the present invention. These pieces of information representative of the identification numbers may be selectively read out under the control of signals supplied from a suitable external signal source such as a computer or switch means (not shown) provided externally of the system.

When, now, one of the three groups such as, for example, the third group of the fields or frames allocated to the SWS sound information in the French language is selected, the fields or frames of the three groups are fed, in the ordinary continuous motion picture mode (CMP), to the time-axis extension memory unit 52 of the information decoder network of FIG. 5. The time-axis extension memory unit 52 is also supplied from the system control circuit 50 a control signal indicative of the identification number 2 under the control of a signal from an external control signal source (not shown) and is made operative to time axially extend and register therein the SWS sound information in the fields or frames of the third group alone. The SWS sound information thus registered in the time-axis extension memory unit 52 is time axially extended and read out from the memory unit 52 during reproduction of the SWS picture information in the fields or frames subsequent to the fields or frames of the third group. In this instance, the SWS picture information in the fields or frames subsequent to the fields or frames of the third group may be reproduced in any of the ordinary continuous motion picture mode (CMP), the slow motion picture mode (SMP), the stepped motion picture mode (TMP) and the still picture mode (SP). If desired, the pieces of SWS sound information in all of the fields or frames in the first, second and third groups may once be registered in the time-axis extension memory unit 52 and thereafter the SWS sound information in the fields or frames of only the third group may be exclusively read out in a time axially extended state from the memory unit 52. Such a method is however unadvisable where the storage capacity of the time-axis extension memory unit 52 is limited.

The method of information reproduction as described above with reference to FIG. 9 may be utilized not only for the selective reproduction of SWS sound information in different languages but also for the selective reproduction of different instructions, questions, answers or other messages responsive to those entered into the system or a computer (not shown) coupled to the system by the viewer of the video disc player. Recommended application of such a method will be a computer-assisted two-way video disc player incorporating a still-picture-with-sound system using an information recording and reproducing method according to the present invention.

Figure 10A:
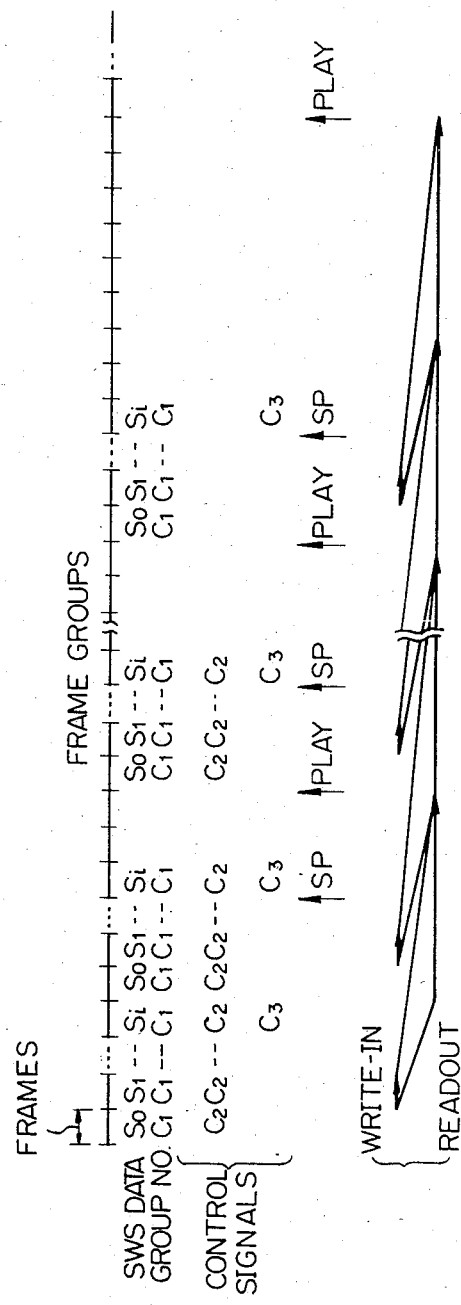
FIGS. 10A and 10B are schematic views which show two different modifications of the method of reproducing picture and sound information as described with reference to in FIG. 9 or, in other words, two different examples of the relationship between the manner in which picture information and sound information signals are inserted into fields or frames and the manner in which the sound information signals are to be reproduced.
Figure 10B:
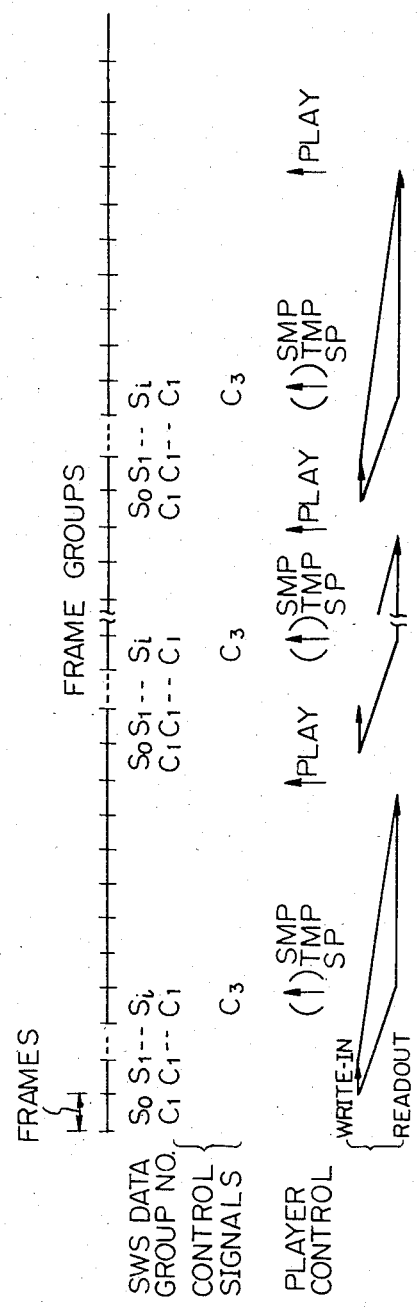

FIGS. 10A and 10B of the drawings show two different modifications of the method of reproducing picture and SWS sound information as described with reference to in FIG. 9 or, in other words, two different examples of the relationship between the manner in which SWS picture and sound information is inserted into fields or frames and the manner in which the SWS sound information is to be reproduced in a method according to the present invention. Each of the methods of information reproduction as shown in FIGS. 10A and 10B thus involves control signals which are indicative of the identification numbers of the individual groups of fields or frames. In each of these methods of information reproduction, the groups of the fields or frames into which SWS sound information are inserted are further broken down to a plurality of subgroups which are continuous to or discrete from each other and each subgroup consists of a succession of groups denoted by $S_0, S_1, \ldots S_i$. Thus, $S_0, S_1, \ldots S_i$ denote the identification numbers allocated to the successive groups of fields or frames in each subgroup. Furthermore, $C_1$ denotes a control signal indicating that the SWS sound information in the fields or frames of a group which can be registered in the time-axis extension memory unit 52 of the information decoder network of FIG. 5 while $C_2$ denotes a control signal for continuous reproduction of SWS sound information. Denoted by $C_3$ is a control signal to actuate the time-axis extension memory unit 52 to commence readout of the SWS sound information registered therein.

In the method of information reproduction as shown in FIG. 10A, the SWS sound information in the fields or frames of the subgroup with the identification number $S_1$ in each series of groups $S_0$ to $S_i$ is selected for being registered in the time-axis extension memory unit 52 of the information decoder network. The SWS sound information thus registered in the time-axis extension memory unit 52 is time axially extended and read out from the memory unit 52 in response to the control signal $C_3$ so that SWS sound information is reproduced continuously under the control of the control signals $C_2$. The control signal $C_3$ is supplied to the time-axis extension memory unit 52 at the end of the last field or frame in the group $S_i$ in each series of groups $S_0$ to $S_i$. The video disc player is set for the ordinary continuous motion picture mode (CMP) until the first field or frame in the group $S_i$ in the second series of groups $S_0$ to $S_i$ appears. When the first field or frame in the group $S_i$ in the second series of groups $S_0$ to $S_i$ appears, the video disc player is shifted from the continuous motion picture mode to the still picture mode (SP). Upon completion of the readout of the SWS sound information in the fields or frames of the subgroup $S_1$ in a series of groups $S_0$ to $S_i$, the SWS sound information in the fields or frames of the group $S_1$ in the immediately subsequent series of groups $S_0$ to $S_i$ is time axially extended and read out from the time-axis extension memory unit 52 in response to the next control signal $C_3$. Each time the SWS sound information read out from the time-axis extension memory unit 52 thus shifts from one series of groups $S_0$ to $S_i$ to another, the video disc player is caused to shift from the still picture mode (SP) to the continuous motion picture mode (CMP) so that stepped motion pictures are displayed while the SWS sound information is being continuously reproduced. When the read time for a series of groups $S_0$ to $S_i$ equals the duration of an $i+1$ number of fields or frames, the video disc player may be left in a condition continuing the continuous motion picture mode for the group $S_i$ in each series of groups $S_0$ to $S_i$. In this instance, continuous motion pictures are produced while the SWS sound information is being continuously reproduced.

The method of information reproduction as shown in FIG. 10B is essentially similar to the method described with reference to FIG. 9. In the method shown in FIG. 10B, the SWS sound information in the fields or frames of the group with the identification number $S_1$ in each series of groups $S_0$ to $S_i$ is thus also selected for being registered in the time-axis extension memory unit 52 of the information decoder network. The SWS sound information registered in the time-axis extension memory unit 52 is time axially extended and read out from the memory unit 52 in response to the control signal $C_3$ which is also supplied to the time-axis extension memory unit 52 at the end of the last field or frame in the group $S_i$ in each series of groups $S_0$ to $S_i$. The readout of the SWS sound information lasts continously throughout the period of reproduction of the SWS picture information in the fields or frames subsequent to the series of groups $S_0$ to $S_i$ until the first field or frame in the subsequent series of groups $S_0$ to $S_i$ appears. Upon completion of the readout of the SWS sound information in one series of $S_0$ to $S_i$, the SWS sound information in the fields or frames of the group $S_i$ in another series of groups $S_0$ to $S_i$ is written into the time-axis extension memory unit 52. In FIG. 10B, the upwardly directed arrow enclosed in parentheses indicates that the video disc player need not extra control when SWS sound information is to be reproduced for continuous motion pictures.

In each of the methods of FIGS. 10A and 10B, the readout of SWS sound information is commenced at the end of the last field or frame in the subgroup $S_i$ in each series of groups $S_0$ to $S_i$ whichever group may be selected. If desired, however, the readout of SWS sound information may be started at a point of time when the write-in of SWS sound information in the time-axis extension memory unit 52 of the information decoder network is complete. In this instance, the control signal $C_3$ to dictate the start of reading is dispensed with. The sound information block or blocks into which the SWS sound information contained in the supplied video format signal Svf is to be inserted may be determined by a suitable control signal.

The write-in and readout of SWS sound information is controlled on the basis of control signals supplied to the time-axis extension memory unit 52 of the information decoder network as above described but, if desired, may be controlled by signals supplied from a suitable external signal source such as a computer so as to add to the flexibility of operation of the system used to carry out a method according to the present invention. If, thus, the SWS sound information in the fields or frames in one group of each series of groups $S_0$ to $S_i$ are to be registered in one storage area of the time-axis extension memory unit 52 and the SWS sound information in the fields or frames in another group of the series of groups $S_0$ to $S_i$ are to be registered in another stoarage area of the memory unit 52, the memory unit 52 may be controlled by signals from the computer in such a manner that the selected identification number of the group of fields or frames is changed to another one and the SWS sound information in the new field or frame group is written into that storage area of the memory unit 52 which is different from the storage area which the sound information in the originally selected group of fields or frames was to be registered. If, in this instance, that storage area of the memory unit 52 into which the originally selected group of fields or frames is occupied with the SWS sound information previously registered therein, the particular SWS is not erased and can thus be maintained in the memory unit 52 for repeated or later use.

The information recording and reproducing method according to the present invention as hereinbefore described is operable for reproducing SWS information in various manners but, for this reason, tends to be costly and intricate in construction. There may however be cases where the functions of the system are outweighted by saving of the production cost of the system. If, thus, the number of the sound reproducing channels and the write-in and readout sampling frequencies of the memory units in the information encoder and decoder networks are predetermined, the control means which would otherwise be required for the selection of the number of the sound reproducing channels and the write-in and readout sampling frequencies could be dispensed with. If, furthermore, the memory unit of the information decoder network is constructed to start the readout operation immediately upon completion of the write-in operation, then the control means which would otherwise be required for the control of the timings at which the readout operation is to be started. On the other hand, the principles of operation of the video disc player to be used with the system according to the present invention could be simplified and accordingly the production cost of the player could be reduced if some of the functions of the system are sacrificed. If, thus, the information recording and reproducing method according to the present invention is used with a video disc player of the optically scanning type and is modified so that the still picture mode is selected in the video disc player in the presence of a Philips code and that the player is shifted from the still picture mode to the ordinary continuous motion picture mode at a point of time when the readout of SWS sound information from the memory unit of the information decoder network is complete, the control means which would otherwise be required for the shifting of the video disc player between these two modes of operation could be dispensed with.

Figure 11A:
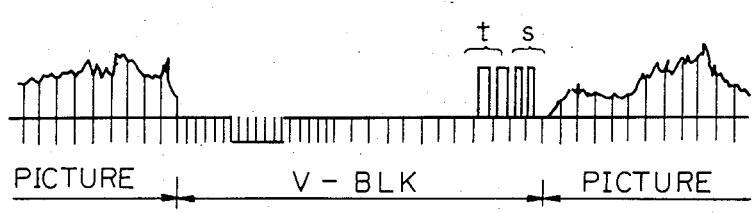
FIG. 11A is a view which shows an example of the waveform of a video format signal including sound information signals entrained on two horizontal scanning lines.
Figure 11B:
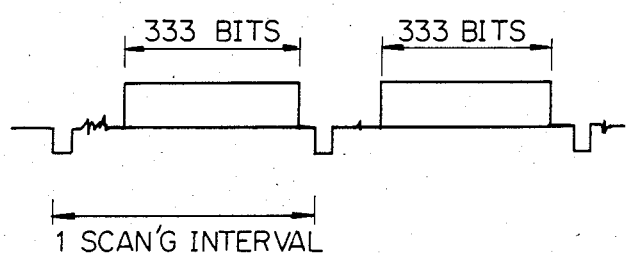
FIG. 11B is a view which shows to an enlarged scale the sound information signals in the waveform shown in FIG. 11A.

When, for example, human vocal sounds are used as sound information and are converted into adaptive differential pulse code modulated (ADPCM) digital signals, the transmission rate of the information of the order of 666 bits per field will suffice if the information is transmitted at the rate of 40 kilobits per second, viz., at a rate to produce continuous motion pictures. These pieces of information transmitted are recorded on two horizontal scanning lines in a vertical blanking zone of the display area or on two invisible scanning lines in a suitable area close to the vertical blanking zone of the display area of a monitoring television receiver (not shown). Thus, each of the two scanning lines has superposed thereon 333 bits of data as will be seen from FIG. 11A which shows an example of the waveform of a video format signal including sound information signals s entrained on two of the horizontal scanning lines. FIG. 11B shows to an enlarged scale the sound information signals s on the two horizontal scanning lines. Indicated at t in FIG. 11B are test signals such as the signals for color bars of a television testing pattern. Where the video disc player has two sound reproducing channels, the sound information may be recorded on four horizontal scanning lines. If, furthermore, it is desired that musical information be superposed on the vocal information, it will be required to have the sound information entrained on a greater number of horizontal scanning lines so as to add to the information transmission rate per field. Where redundant bits of data are to be added to the sound information as error correction codes, either the number of the horizontal scanning lines to be put to use may be further increased or an increased number of bits of data may be contained in each of the horizontal scanning lines to be used. Continuous motion pictures accompanied by sound information can be in any of these manners produced without having recourse to reduction in the number of the pictures to be displayed.

Figure 12:
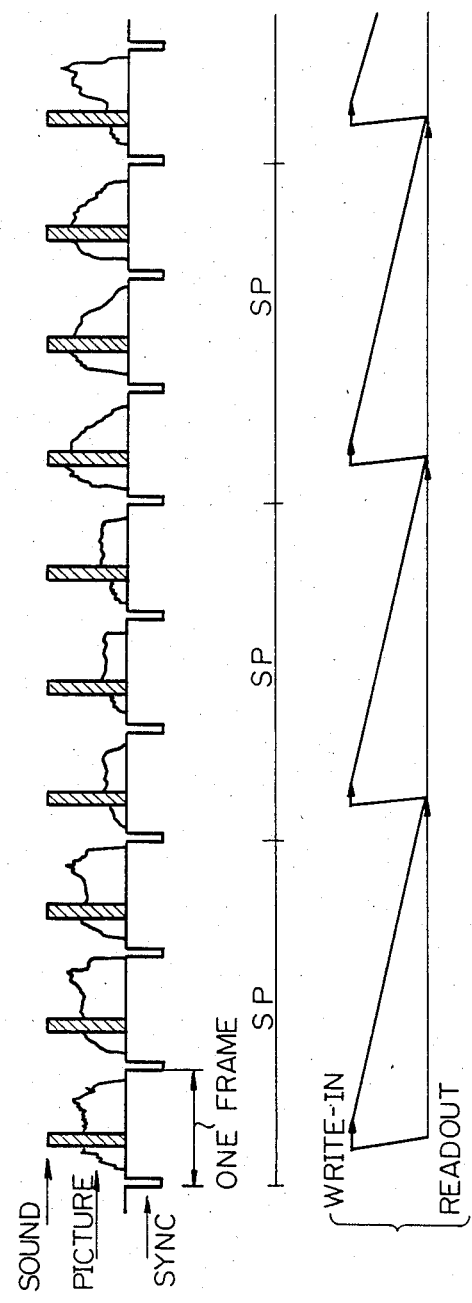
FIG. 12 is a schematic view showing another preferred example of a method of reproducing picture and sound information in a "still-picture-with-sound" mode in a accordance with the present invention or, more specifically, a preferred example of the method of reducing the storage capacity of the time-axis extension memory unit incorporated in the signal decoder network shown in FIG. 5 where sound information is to be reproduced continuously in successive fields or frames.

FIG. 12 of the drawings shows still another preferred example of the method of reproducing picture and sound information in a "still-picture-with-sound" mode in an information recording and reproducing method according to the present invention. The method of information reproduction as herein shown is useful for reducing the storage capacity of the time-axis extension memory unit 52 of the information decoder network of FIG. 5 where sound information is to be reproduced continuously in successive fields or frames. For the sake of convenience, it is herein assumed that the amount of sound information inserted into each field or frame is equal to the amount of picture information in a predetermined number of fields or frames and is fixed and that the sound information is inserted into the field or frame at a predetermined location in the field or frame. If, now, the readout of sound information from the time-axis extension memory unit 52 is started immediately after the write-in of the sound information therein is started, the sound information is read out at all times after the sound information is written into the memory unit 52 as will be seen from FIG. 12 since the write-in sampling frequency $f_2$ of the memory unit 52 is higher than the read-out sampling frequency $f_1$ thereof. Because, furthermore, of the fact that the sound information in one field or frame corresponds to the picture information in a predetermined number of consecutive fields or frames (which are in FIG. 12 assumed to be three in number), the readout of the sound information is started at a fixed timing in each series of fields or frames. If, therefore, the readout of sound information in a field or frame is terminated immediately prior to the write-in of the last bit of the immediately subsequent sound information and the readout of sound information in a field or frame is started immediately posterior to the write-in of the last bit of the immediately preceding sound information, the pieces of sound information can be read out continuously in the consecutive fields or frames. In this instance, the storage capacity of the time-axis extension memory unit 52 or, in other words, the maximum amount of sound information which the memory unit 52 is required to have stored therein is equal to the difference between the total amount of the sound information to be written into the memory unit 52 and the amount of the sound information read out from the memory unit 52 by the time when the write-in of the sound information is terminated. The time-axis extension memory unit 52 is in this manner permitted to have a significantly reduced storage capacity. In practice, however, the storage capacity of the time-axis extension memory unit 52 may be made equal to the amount of sound information in a single field or frame to provide ease of control and to preclude an occurrence of the jittering of the signals to be reproduced. The number of the consecutive fields or frames to which the sound information in a single field or frame is to correspond may be selected arbitrarily and, if the sound information in a single field or frame corresponds to the picture information in a single field or frame, then continuous motion pictures will be produced.

Description will be hereinafter made regarding the method of correcting errors in the control information used in an information recording and reproducing method according to the present invention.

In a method according to the present invention, the control information is digitalized and consists of a plurality of blocks of a predetermined duration. BCH (Bose-ChaudhuriHocquenghem) coded redundant bits are added to each of these blocks for correcting erred bits of data in each block. Each of the information blocks thus afforded with such redundant bits of data is phase or frequency modulated, an example of the waveform indicative of such phase modulated data being shown in FIG. 13A. As will be seen from FIG. 13A, the waveform of the phase modulated data rises at the middle point of the cell of the bit when the digitalized information is of the logic "1" value and falls at the middle point of the cell of the bit when the digitalized information is of the "0" value. Thus, the phase modulated binary signal is inverted in level between every adjacent two bits of the signal. There may be cases where burst errors are produced which can not be corrected by the BCH coded redundant bits of data alone added to the individual data blocks, as will be seen from FIG. 13B. In FIG. 13B, the waveform A indicates that which involves no such errors while the waveform B indicates that which involves burst errors. The burst errors herein referred to are continuous errors which are caused by a dropout. Such a burst error is detected from a break in the regularity of inversion in the level of the phase modulated signal and a signal indicative of an occurrence of such a break is used to produce an error pointer signal in each of the data blocks. In an error correcting system according to the present invention, an error pointer signal is thus produced when the number of bits having no rises and falls of waveform at the middle points of the bit cells in each of the data blocks becomes larger than the number of bits which can be corrected with use of a BCH code. Thus, the non-inverted bits in each of the two data each of the data blocks as well as the associated block of the parity check codes are counted and an error pointer signal is when the number of the non-inverted bits thus counted is larger than a predetermined value.

For this purpose, a block Bc of parity check codes each consisting of a predetermined number of redundant bits is added to every two consecutive data blocks Ba and Bb each having the redundant bits of data added thereto as above described, as shown in FIG. 14 of the drawings. The block Bc of the parity check codes herein shown is produced on the basis of the data blocks Ba and Bb and are composed of binary parity check codes $C_0, C_1, \ldots C_n$ each having a predetermined number of redundant bits. When it is assumed that the data block Ba are composed of binary control data codes $A_0, A_1, \ldots A_n$ and the data block Bb composed of binary control data codes $B_0, B_1, \ldots B_n$ as shown, the block Bc of the parity check codes $C_0, C_1, \ldots C_n$ is produced in such a manner that the following relation holds:

$$C_i = A_i + B_i \ (i = 0, 1, \ldots n)$$

where the sign "+" indicates the rule of modulo-two addition. Correction of a burst error is thus effected by the use of the block Bc of the parity check codes thus produced and the above mentioned error pointer signal indicative of the occurrence of the burst error. Each of the control data codes $A_0, A_1, \ldots A_n$ and $B_0, B_1, \ldots B_n$ and the parity check codes $C_0, C_1, \ldots C_n$ is composed of a predetermined number of bits.

Figure 15:
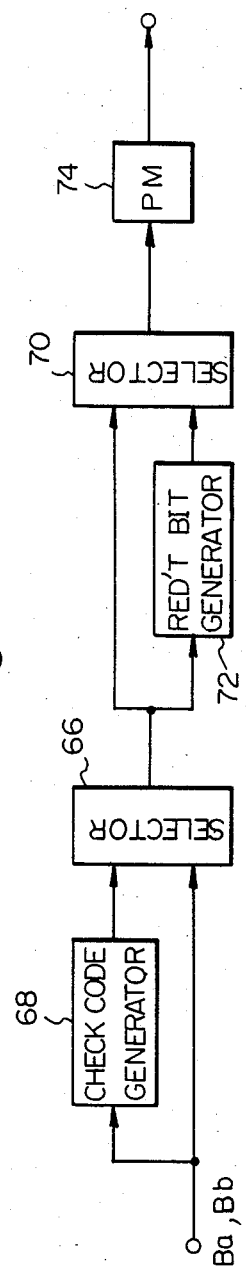
FIG. 15 is a block diagram showing a preferred example of the error correction coding and phase modulating circuit arrangement adapted to produce error correction codes in accordance with the principle described with reference to FIG. 14 and to modulate the error correction coded control information in accordance with the principle described with reference to FIGS. 13A and 13B.

FIG. 15 of the drawings shows a preferred example of the error correction coding and phase modulating circuit arrangement adapted to produce error correction codes in accordance with the principle described with reference to FIG. 14 and to modulate the error correction coded control information in accordance with the principle described with reference to FIGS. 13A and 13B. In the circuit arrangement herein shown, the codes in the above mentioned consecutive data blocks Ba and Bb are fed to a first selector circuit 66 and a parity check code generating circuit 68. On the basis of the control data codes $A_0, A_1, \ldots A_n$ and $B_0, B_1, \ldots B_n$ in the data blocks Ba and Bb, the parity check code generating circuit 68 produces a block consisting of the parity check codes $C_0, C_1, \ldots C_n$ in the above described manner. The block $B_c$ consisting of the parity check codes thus generated is supplied to the first selector circuit 66. The first selector circuit 66 is operative to pass therethrough the control data codes Ba and Bb and the parity check code Bc without modification and to supply these codes Ba, Bb and Bc to a second selector circuit 70 and a BCH coded redundant bit producing circuit 72. The BCH coded redundant bit producing circuit 72 is operative to add redundant bits of error correction data to each of the codes Ba, Bb and Bc. On the other hand, the second selector circuit 72 is operative to pass therethrough the control data codes $A_0, A_1, \ldots A_n$ in the preceding data block Ba, the BCH coded redundant bits added to the data block Ba, the control bits of data $B_0, B_1, \ldots B_n$ in the subsequent data block Bb, the BCH coded redundant bits added to the data block Bb, the parity check bits $C_0, C_1, \ldots C_n$ forming the parity check code Bc, and the BCH coded redundant bits added to the parity check code Bc, in this sequence. The bits of data thus delivered from the second selector circuit 72 are modulated in phase by a phase modulator 74 in accordance with the principle described with reference to FIG. 13A. If desired, correction of burst errors may be effected with use of b-adjacent error correction codes in lieu of parity check codes.

Figure 16:
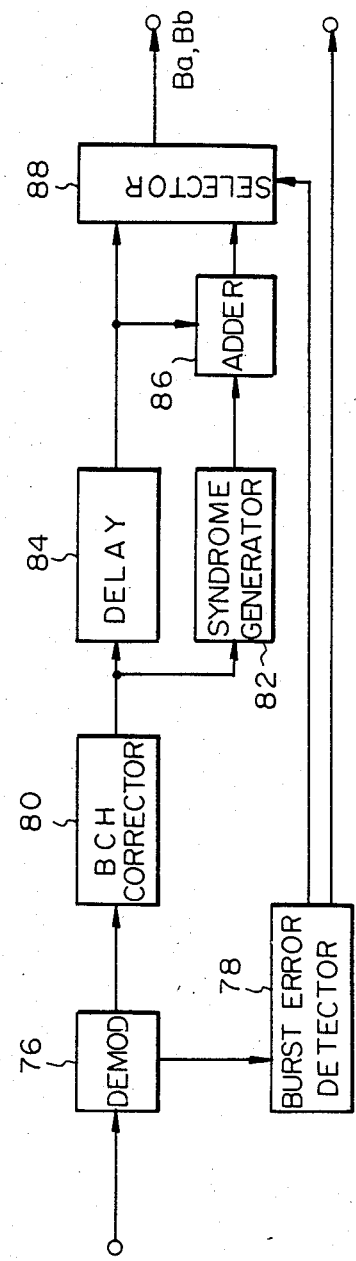
FIG. 16 is a block diagram showing a preferred example of the circuit arrangement adapted to encode and correct the error correction coded and phase modulated data bits produced by the circuit shown in FIG. 15.

FIG. 16 of the drawings shows a preferred example of the circuit arrangement adapted to encode and correct the error correction coded and phase modulated bits of data produced by the circuit described above with reference to FIG. 15. In the circuit illustrated in FIG. 16, the error correction coded and phase modulated bits of data delivered from the phase modulator 74 of the circuit shown in FIG. 15 are fed to a phase demodulator 76 and are thus demodulated in phase. The demodulated bits of data are supplied on one hand to a burst error detector circuit 78 and on the other hand to a BCH corrector circuit 80. The burst error detector circuit 78 is adapted to check the supplied blocks Ba, Bb and Bc of the data and parity check codes for errors of bits in each of the blocks, while the BCH corrector circuit 80 is operative to correct erred bits of data in each of the blocks Ba, Bb and Bc by means of a BCH code. The bits of data thus corrected by the BCH corrector circuit 80 are supplied to a syndrome generator circuit 82 and a delay circuit 84. The syndrome generator circuit 82 is operative to generate a syndrome S which is given as the modulo-two sum of the initial data blocks Ba and Bb of control information, while the delay circuit 84 is operative to pass the data blocks Ba and Bb to an adder circuit 86 and a selector circuit 88 in such a manner that the preceding data block issue from the delay circuit 84 at a point of time when the generation of the syndrome S is complete. The adder circuit 86 is supplied with not only the data blocks Ba and Bb from the delay circuit 84 but the syndrome S generated by the syndrome generator circuit 82 and produce a modulo-two sum of these. If, thus, a burst error is contained in the data block Bb so that the data block Bb is erred as Bb'=Bb+e, there results $$S + Bb' = Bb + e + Ba + Bb + e + Bc$$

since Bb=Ba+Bc. The output data from the adder circuit 86 is in this fashion cleared of burst errors. The selector circuit 88 operates in such a manner that, if either the data block Ba or the data block Bb involves a burst error and if, furthermore, the parity check code Bc is correct, the selector circuit 88 passes therethrough the output date from the adder circuit 86 when supplied with an erred data. Correct data are thus at all times delivered from the selector circuit 88. Such a function of the selector circuit 88 is controlled by an output signal from the burst error detector circuit 78 which is responsive to burst errors in the supplied data blocks Ba, Bb and Bc as above described. In case burst errors are detected in two or more of the data blocks Ba, Bb and Bc of the data and parity check bits, the burst error detector circuit 78 produces a flag indicating that the errors can not be corrected. The flag is supplied to a suitable subsequent circuit for appropriate processing. The parity check code Bc need not be delivered from the selector circuit 30 and is for this reason not checked for errors therein. The burst error detector circuit 78 may be composed of a suitable combination of gate, counter and latch networks, while each of the BCH corrector circuit 80 and the syndrome generator circuit 82 may be composed of a suitable combination of a gate circuit, a shift register, an exclusive-or logic circuit and a read-only memory (ROM). The delay circuit 84 may be composed of a combination of a shift register and a latch circuit.

While it has been assumed that the error correction coded data are modulated in phase, such data may be frequency modulated as previously noted. In the frequency modulation, a piece of information of the logic "1" value is processed to correspond to an inverted state of a bit and a piece of information of the logic "0" value is processed to correspond to a non-inverted state of a bit and, furthermore, every bit is inverted at the junction between the cells of adjacent two bits.

Figure 17:
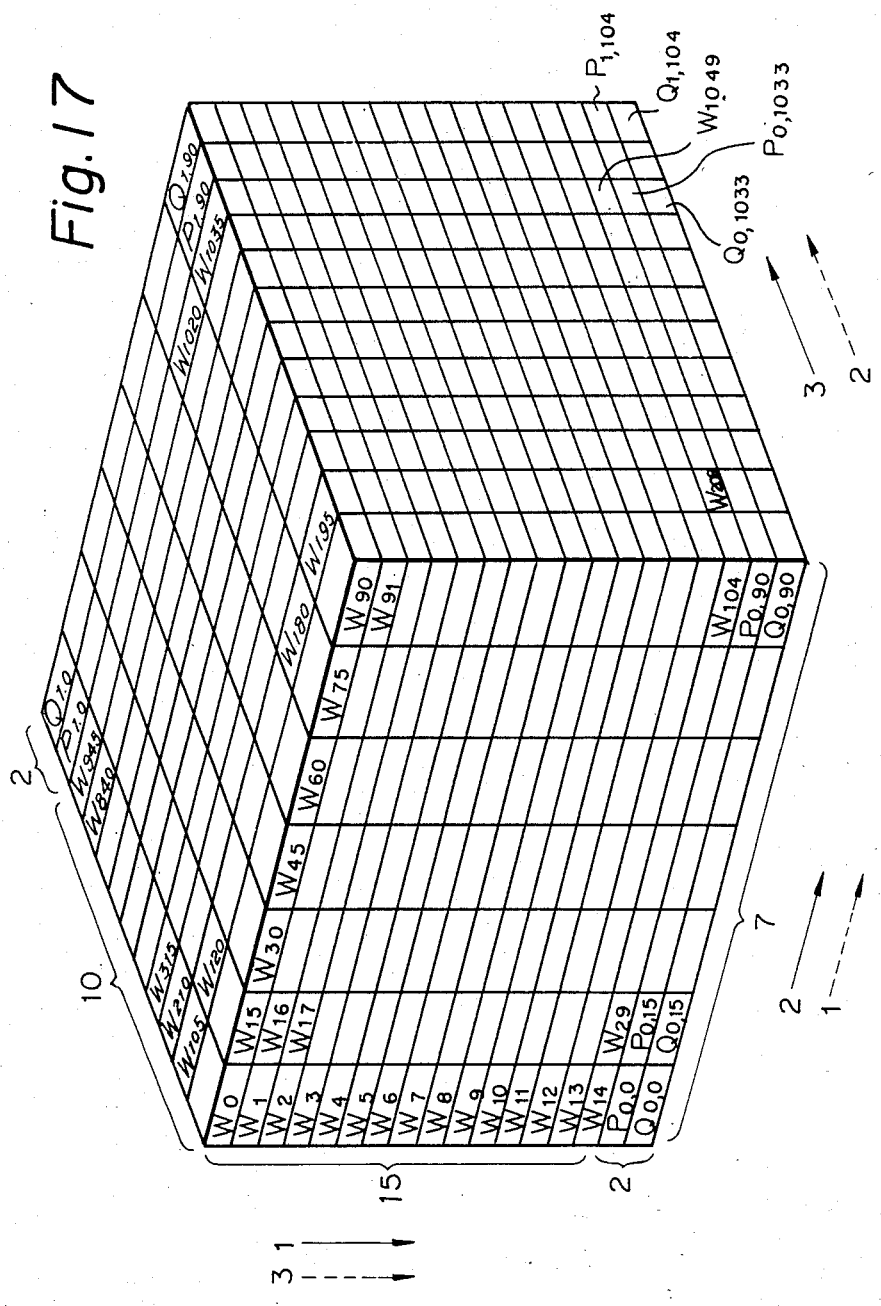
FIG. 17 is a perspective view showing a three-dimensional matrix composed of the sound information codes which are to be interleaved and error correction coded on predetermined principles in a method according to the present invention.

Description will be hereinafter made regarding the method of correcting errors in the sound information used in a system used to carry out an information recording and reproducing method according to the present invention. For the sake of convenience of description, it is herein assumed that the picture zone forming part of the display area 30 shown in FIG. 1 of the drawings is assumed to be divided into $1 \times 14$ rectangular sections or blocks formed by one column and an fifteen rows. It is further assumed that 1050 successive sound information codes are to be introduced into each of these fifteen sections or blocks of the picture zone and are represented by $W_i$ where i is an integer from 0 to 1049 and that each of these sound information codes $W_i$ is composed of four bits of data. The subscript i annexed to the letter W is indicative of the order in which the successive sound information codes $W_i$ are to be sampled. The 1050 sound information codes are further assumed to be arranged in a three-dimensional matrix having a height consisting of 15 codes, a width consisting of 7 codes and a depth consisting of 10 codes, as shown in FIG. 17 of the drawings. In FIG. 17, the numerals accompanied by arrows in full line indicate the order in which the codes $W_1$ to $W_{1049}$ are to be sampled the numerals accompanied by arrows in broken line indicate the order in which the codes $W_1$ to $W_{1049}$ are to be inserted into the video format signal. Thus, FIG. 17 shows principles on which the sound information codes $W_1$ to $W_{1049}$ are to be interleaved and error correction coded in a method according to the present invention.

In the three-dimensional matrix shown in FIG. 17, the fifteen sound information codes $W_0$, $W_1$, $W_2$, ... $W_{14}$ in the leftmost column of the foremost layer are first successively sampled in this sequence and thereupon two parity check codes $P_{0,0}$ and $Q_{0,0}$ are added to the last one of these sound information codes. Thereafter, the fifteen sound information codes $W_{15}$, $W_{16}$, $W_{17}$, ... $W_{29}$ in the second leftmost column of the foremost layer are successively sampled in this sequence and thereupon two parity check codes $P_{0,15}$ and $Q_{0,15}$ are added to the last one of these sound information codes. In this manner, the sound information codes in all the columns of the front layer are sampled in succession and are given parity check codes when the last one of the fifteen sound information codes $W_{90}$, $W_{91}$, $W_{92}$, ... $W_{104}$ in the rightmost column of the foremost layer is sampled and parity check codes $P_{0,90}$ and $Q_{90}$ are added to the sound information codes. Thereafter, the fifteen sound information codes $W_{105}$, $W_{106}$, $W_{107}$, ... $W_{119}$ in the leftmost column of the second foremost layer are successively sampled in this sequence and thereupon two parity check codes $P_{0,105}$ and $Q_{0,105}$ are added to the last one of these sound information codes, though not seen in FIG. 17. Finally, the fifteen sound information codes $W_{1035}$, $W_{1036}$, $W_{1037}$, ... $W_{1049}$ in the rightmost column of the lowermost layer are successively sampled whereupon two parity check codes $P_{0,1035}$ and $Q_{0,1035}$ are added to the last one of these sound information codes. Thus, the sound information codes $W_0$ to $W_{1049}$ in the three-dimensional matrix are sampled and parity check codes $P_{0,j}$ and $Q_{0,j}$ (j=0, 15, 30, 45, ... 1035) are added to the last one of the sound information codes of each column. These parity check codes $P_{0,0}$ and $Q_{0,0}$ to $P_{0,1035}$ and $Q_{0,1035}$ are used as one set of parity check codes for the sound information codes $W_0$ to $W_{1049}$. After all the columns of the three-dimensional matrix are sampled and error correction coded as described above, another set of parity check codes $P_{1,k}$ and $Q_{1,k}$ are added to the three-dimensional matrix, wherein k=0, 1, 2, ... 14, $P_{0,0}$, $Q_{0,0}$, 15, 16, ... , 29, $P_{0,15}$, $Q_{0,15}$, 30, ... , 104, $P_{0,90}$, $Q_{0,90}$. The parity check codes $P_{1,0}$ and $Q_{1,0}$ are added to the last one of the ten sound information codes $W_0$, $W_{105}$, $W_{210}$, ... $W_{945}$ in the leftmost array (shown arranged in the direction of the arrow in full line with the numeral 3 in FIG. 17) of the uppermost layer and, likewise, the parity check codes $P_{1,1}$ and $Q_{1,1}$ are added to the last one of the ten sound information codes $W_1$, $W_{106}$, $W_{211}$, ... $W_{946}$ in the leftmost array of the second uppermost layer. In this fashion, the parity check codes $P_{1,15}$ and $Q_{1,15}$ are added to the last one of the ten sound information codes $W_{15}$, $W_{120}$, $W_{225}$, ... $W_{960}$ in the second leftmost array of the uppermost layer the parity check codes $P_{1,104}$ and $Q_{1,104}$ are added to the last one of the ten sound information codes $W_{90}$, $W_{195}$, $W_{300}$, ... $W_{1049}$ in the rightmost array of the lowermost layer. Each of the parity check codes $P_{0,j}$, $Q_{0,j}$, $P_{1,k}$ and $Q_{1,k}$ used in an information recording and reproducing method according to the present invention is assumed to be composed of b-adjacent coded four redundant bits.

Figure 18:
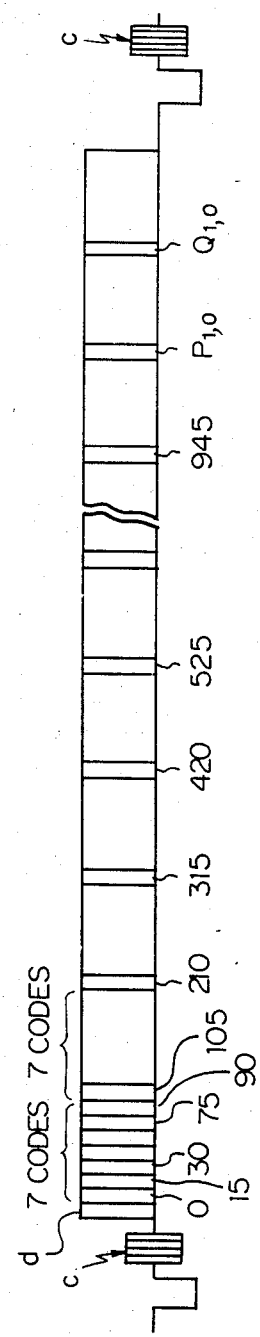
FIG. 18 is a view showing a waveform of a video format signal carrying sound information codes interleaved and given parity check codes in accordance with the principles depicted in FIG. 17.

The sound information codes $W_0$ to $W_{1049}$ and the parity check codes $P_{0,0}$ and $Q_{0,0}$ to $P_{1,104}$ and $Q_{1,104}$ in the individual columns of the three-dimensional matrix are interleaved into a total of 204 groups each consisting of seven codes in each of the rows of the matrix. The first group of the codes is thus composed of the sound information codes $W_0$, $W_{15}$, $W_{30}$, ... $W_{90}$ and the second group of the codes are composed of the sound information codes $W_{105}$, $W_{120}$, $W_{135}$, ... $W_{195}$. The eleventh group of the codes are composed of the parity check codes $P_{1,0}$, $P_{1,15}$, $P_{1,30}$, ... $P_{1,90}$ and the twelfth group of the codes consists of the sound information codes $W_1$, $W_{16}$, $W_{31}$, ... $W_{91}$. The last, viz., 204th group of the codes are composed of the parity check codes $Q_{1,14}$, $Q_{1,29}$, $Q_{1,44}$, ... $Q_{1,104}$. These two hundred and four groups of the sound information and parity check codes are superposed in succession on the seventeen horizontal scanning lines in a field of the video format signal in the sequence indicated by the figures attached to the arrows in broken line in FIG. 17. In other words, the sound information and parity check codes contained in each horizontal layer of the three-dimensional matrix shown in FIG. 17 are superposed on each of the seventeen horizontal scanning lines. FIG. 18 of the drawings shows a waveform of a video format signal carrying codes interleaved and given parity check codes in accordance with the principles described with reference to FIG. 17. More specifically, FIG. 18 shows the sequence of the codes superposed on the foremost one of the horizontal scanning lines of the video format signal as above described. Indicated at c on the wave form of FIG. 18 is a color burst signal superposed on a leading end portion of the scanning line and at d is a data synclonizing signal which follows the color burst signal. The groups of the codes in the twelve rows of the uppermost layer of the three-dimensional matrix shown in FIG. 17 are thus superposed on the foremost one of the seventeen scanning lines and the groups of the codes in the twelve rows of the uppermost layer are superposed on the subsequent scanning line. In this manner, twelve groups of the sound information and parity check codes in each layer of the three-dimensional matrix are superposed on each of the seventeen scanning lines of a field. All the sound information and parity check codes are thus interleaved or re-arranged in the sequence indicated by the figures attached to the arrows in full line in FIG. 17.

The sound information and parity check codes being superposed on the horizontal scanning lines in accordance with the above described principle, the parity check codes $P_{1,0}$ and $Q_{1,0}$ serve as error correction signals for one set of ten sound information codes $W_0$, $W_{105}$, $W_{210}$, ... $W_{945}$ superposed in a dispersed state on the foremost one of the horizontal scanning lines of a field and, likewise, the parity check codes $P_{1,15}$ and $Q_{1,15}$ serve as error correction signals for another set of ten sound information codes $W_{15}$, $W_{120}$, $W_{225}$, ... $W_{960}$ superposed in a dispersed state on the foremost horizontal scanning line. Generally, the parity check codes $P_{1,k}$ and $Q_{1,k}$ serve as error correction signals for a set of ten sound information codes superposed in a dispersed state on each of the seventeen horizontal scanning lines of a field and contained in each of the arrays shown arranged in the direction of the arrow in full line with the numeral 3 in FIG. 17. During reproduction of the video format signal, each set of ten sound information codes dispersed on each of the seventeen horizontal scanning lines in a field of the video format signal are checked for correction by the parity check codes $P_{1,k}$ and $Q_{1,k}$ thus superposed on the scanning line. On the other hand, the fifteen sound information codes contained in each column of the three-dimensional matrix of FIG. 17 and respectively dispersed on fifteen out of the seventeen horizontal scanning lines of a field are checked for correction by the parity check codes $P_{0,i}$ and $Q_{0,i}$ superposed on each of the fifteen scanning lines. For example, the fifteen sound information codes $W_0$, $W_1$, $W_2$, ... $W_{14}$ contained in the leftmost column in the front layer and respectively dispersed on the fifteen out of the seventeen horizontal scanning lines of a field are checked for correction by the parity check codes $P_{0,0}$ and $Q_{0,0}$ superposed on each of the fifteen scanning lines.

Each of the parity check codes $P_{0,j}$, $Q_{0,j}$, $P_{1,k}$ and $Q_{1,k}$ above described is a 4-adjacent error correction code operable for checking adjacent errors in a code of four bits. Since each of the sound information codes $W_0$ to $W_{1049}$ are composed of four bits as previously mentioned, each of the parity check codes $P_{0,j}$, $Q_{0,j}$, $P_{1,k}$ and $Q_{1,k}$ is thus adapted to check each of the sound information codes for adjacent errors therein. For this purpose, the parity check codes $P_{0,j}$ and $Q_{0,j}$ are produced in the following manner.

$$P_{0,0} = W_0 + W_1 + \ldots + W_{13} + W_{14}$$

$$P_{0,15} = W_{15} + W_{16} + \ldots + W_{28} + W_{29}$$

.

.

.

$$P_{0,1035} = W_{1035} + W_{1036} + \ldots + W_{1048} + W_{1049}$$

$$Q_{0,0} = T^{14} \cdot W_0 + T^{13} \cdot W_1 + \ldots + T \cdot W_{13} + W_{14}$$

$$Q_{0,15} = T^{14} \cdot W_{15} + T^{13} \cdot W_{16} + \ldots + T \cdot W_{28} + W_{29}$$

.

.

.

$$Q_{0,1035} = T^{14} \cdot W_{1035} + T^{13} \cdot W_{1036} + \ldots + T \cdot W_{1048} + W_{1049}$$

Here, the sign "+" indicates the rule of modulo-two addition and each of the codes P, Q and W is composed of a column vector. T is given by $$T = \begin{bmatrix} 0 & 0 & 0 & 1 \\ 1 & 0 & 0 & 1 \\ 0 & 1 & 0 & 0 \\ 0 & 0 & 1 & 0 \end{bmatrix}$$

Assuming that the sound information codes $W_0$ to $W_{14}$ contain a single error, the error is corrected by the parity codes $P_{0,0}$ and $Q_{0,0}$. If, thus, a certain sound information code $W_l$ is erred as $W'_l = W_l + e_l$ (wherein $e_l$ is indicative of an error pattern), then syndromes $S_{O,P}$ and $S_{O,Q}$ are given from the following equations:

$$S_{0,P} = P_{0,0} + W_0 + W_1 + \ldots + W'_l + \ldots + W_{14} = e_l$$

$$S_{0,Q} = Q_{0,0} + T^{14} \cdot W_0 + T^{13} \cdot W_1 + \ldots + T^{14-l} \cdot W'_l + \ldots + W_{14} = T^{14-l} \cdot e_l$$

Here, $T^{l+1} \cdot S_{0,Q} = T^{15} \cdot e_l = e_l = S_{0,P}$, hence $T^{15} = 1$.

When, therefore, $S_{0,Q}$ is multiplied by T until the former becomes equal to $S_{0,P}$, the code $W_l$ to be sampled can be determined from the number of times $1 \times 1$ by which $S_{0,Q}$ is multiplied by T. When the value of l is found in this manner, the erred code $W'_l$ can be corrected as follows:

$$W'_l + S_{0,P} = W_l + e_l + e_l = W_l$$

The above mentioned syndromes $S_{0,P}$ and $S_{0,Q}$ are expressed in the form of a parity check matrix as follows:

$$S = \begin{pmatrix} S_{0,P} \\ S_{0,Q} \end{pmatrix} = HW = \begin{bmatrix} \ldots & 1 & 1 & 0 \\ T^{14} & T^{13} & \ldots & T & 1 & 0 & 1 \end{bmatrix} \begin{bmatrix} W_0 \\ W_1 \\ \cdot \\ \cdot \\ W_{14} \\ P_{0,0} \\ Q_{0,0} \end{bmatrix}$$

wherein $\mathbb{1}$ is defined as a 4×4 unit matrix.

$$P_{1,0} = W_0 + W_{105} + \ldots + W_{840} + W_{945}$$

$$P_{1,1} = W_1 + W_{106} + \ldots + W_{840} + W_{946}$$

$$P_{1,14} = W_{14} + W_{119} + \ldots + W_{854} + W_{959}$$

$$P_1 P_{0,0} = P_{0,0} + P_{0,105} + \ldots + P_{0,840} + P_{0,945}$$

$$P_1 Q_{0,0} = Q_{0,0} + Q_{0,105} + \ldots + Q_{0,840} + Q_{0,945}$$

$$Q_{1,0} = T^9 \cdot W_0 + T^8 \cdot W_{105} + \ldots + T \cdot W_{840} + W_{945}$$

$$Q_{1,1} = T^9 \cdot W_1 + T^8 \cdot W_{106} + \ldots + T \cdot W_{841} + W_{946}$$

$$Q_{1,14} = T^9 \cdot W_{14} + T^8 \cdot W_{119} + \ldots + T \cdot W_{854} + W_{959}$$

$$Q_1 P_{0,0} = T P_{0,0} + T P_{0,105} + \ldots + T P_{0,840} + P_{0,945}$$

$$Q_1 Q_{0,0} = T^9 \cdot Q_{0,0} + T^8 \cdot Q_{0,105} + \ldots + T \cdot Q_{0,840} + Q_{0,945}$$

On the other hand, the syndrome S is expressed in the form of a parity check matrix as follows:

$$S = \begin{pmatrix} S_{1,P} \\ S_{1,Q} \end{pmatrix} = \mathbb{H} \mathbb{W} = \begin{bmatrix} 1 & 1 & \ldots & 1 & 1 & 1 & 0 \\ T^9 & T^8 & \ldots & T & 1 & 0 & 1 \end{bmatrix} \begin{bmatrix} W_0 \\ W_{105} \\ \vdots \\ W_{945} \\ P_{1,0} \\ Q_{1,0} \end{bmatrix}$$

If it is assumed that $W_m$ is erred as $W'_m = W_m + e_m$, there result $$S_{1,P} = e_m, \; S_{1,Q} = T^{9-m} \cdot e_m, \text{ and}$$

$$T^{m+6} \cdot S_{1,Q} = T^{15} \cdot e_m = e_m = S_{1,P}$$

When the value of m is obtained from these relations, the erred code W' is corrected by
$W'_m \cdot S_{1,P} = W_m + e_m + e_m = W_m$. One correction format to make correction by means of these equations may be to first correct sound information and parity check codes $W_i$, $P_{0,j}$ and $Q_{0,j}$ on the basis of parity check codes $P_{1,k}$ and $Q_{1,k}$ and thereafter further correct the sound information codes $W_i$ on the basis of the parity check codes $P_{0,j}$ and $Q_{0,j}$. Another correction format may be to first find out the positions of the errors through detection of the errors on the basis of parity check codes $P_{1,k}$ and $Q_{1,k}$ and thereafter correct the two erred codes on the basis of parity check codes $P_{0,j}$ and $Q_{0,j}$.

Figure 19:
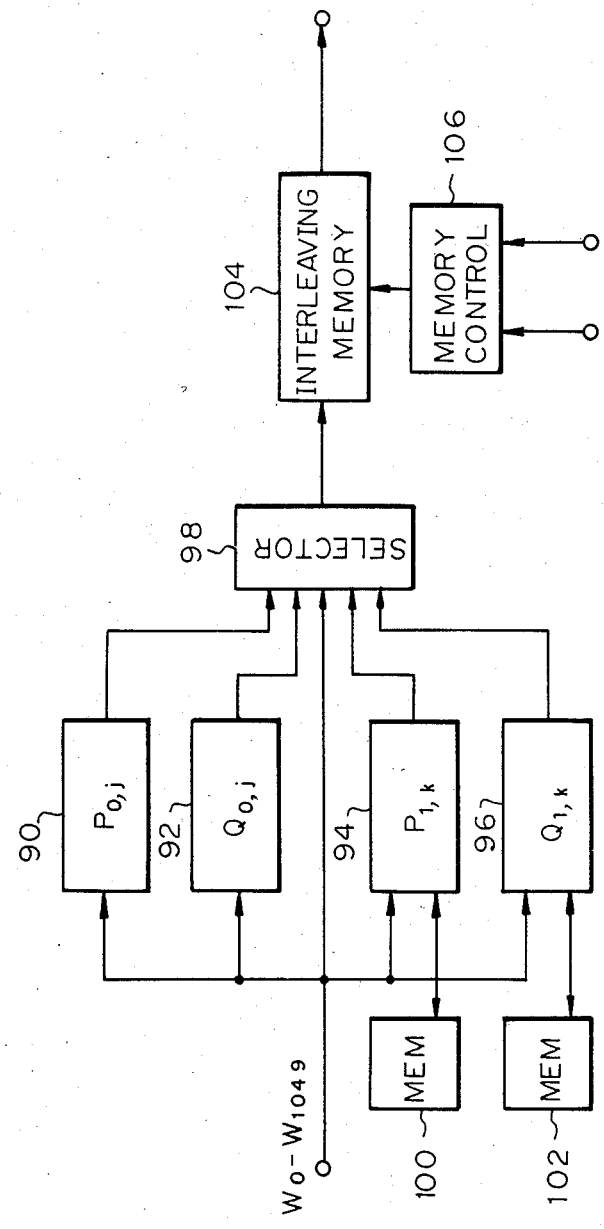
FIG. 19 is a block diagram showing a preferred example of the circuit arrangement adapted to put into practice the principles on which sound information codes are to be interleaved and error correction coded on the principles as shown in FIGS. 17 and 18.

FIG. 19 is a block diagram showing a preferred example of the circuit arrangement adapted to put into practice the principles on which sound information codes are to be interleaved and error correction coded on the principles hereinbefore described with reference to FIGS. 17 and 18. Referring to FIG. 19, the supplied sound information codes $W_0$ to $W_{1049}$ are fed to first, second third and fourth check code generator circuits 90, 92, 94 and 96 and a selector circuit 98. The first and second check code generator circuits 90 and 92 are adapted to generate the parity check codes $P_{0,j}$ and $Q_{0,j}$, respectively, which are to be used for the correction of the errors which may take place between different horizontal scanning lines, while the third and fourth check code generator circuits 94 and 96 are adapted to generate the parity check codes $P_{1,k}$ and $Q_{1,k}$, respectively, which are to be used for the correction of the errors which may take place in one and the same horizontal scanning line. The parity check codes $P_{0,j}$ and $Q_{0,j}$ are to be generated each time fifteen sound information codes are sampled but the parity check codes $P_{1,k}$ and $Q_{1,k}$ are to be generated for the interleaved sound information codes in each of the horizontal scanning lines. For this reason, it is required to temporarily store the values of the latter parity check codes $P_{1,k}$ and $Q_{1,k}$ which are being calculated. The third and fourth check code generator circuits 94 and 96 are thus provided with memory units 100 and 102, respectively, adapted to temporarily register therein such values of the parity check codes $P_{1,k}$ and $Q_{1,k}$. While the parity check codes $P_{1,0}$ and $Q_{1,0}$ are being generated in response to the sound information codes $W_0$, $W_{105}$, $W_{210}$, . . . , other parity check codes such as, for example, the parity check codes $P_{1,1}$ and $Q_{1,1}$ must be generated as the sound information codes $W_1$, $W_{106}$, $W_{211}$, . . . are supplied. As the sound information codes $W_0$, $W_1$, $W_2$, . . . are supplied in succession to the third and fourth check code generator circuits 94 and 96, the values being calculated of the parity check codes $P_{1,k}$ and $Q_{1,k}$ corresponding to the supplied sound information codes are temporarily stored in the memory units 100 and 102, respectively and are read out therefrom as the calculation of the parity check codes $P_{1,k}$ and $Q_{1,k}$ proceeds The write-in and readout of the values being calculated of the parity check codes $P_{1,k}$ and $Q_{1,k}$ in the memory units 100 and 102 are thus repeated until these parity check codes are generated completely.

The parity check codes $P_{0,j}$, $Q_{0,j}$, $P_{1,k}$ and $Q_{1,k}$ thus generated by the check code generators 90, 92, 94 and 96, respectively, are supplied together with the sound information codes $W_i$ to the selector circuit 98 and are passed through the selector circuit 98 as the parity check codes $P_{0,j}$, $Q_{0,j}$, $P_{1,k}$ and $Q_{l,k}$ are generated. The codes passed through the selector circuit 98 are fed to an interleaving memory units 104 which is operative to write in and read out the supplied information under the control of a memory control circuit 106. The sound information and parity check codes $W_i$, $P_{0,j}$, $Q_{0,j}$, $P_{1,k}$ and $Q_{1,k}$ thus stored in the memory unit 104 are addressed and read out therefrom in the sequence indicated by the FIGS. 1 to 3 with the arrows in broken lines in FIG. 17 at timings synchronized with clock and address pulses supplied to the memory control circuit 106. Interleaved and error correction coded sound information and parity check codes are thus delivered from the memory unit 106. Each of the check code generator circuits 90, 92, 94 and 96 is assumed to be constituted by the combination of a shift register and an exclusive-or logic circuit. Each of the memory units 100, 102 and 104 may be constituted by a register or a random access memory (RAM).

Figure 20:
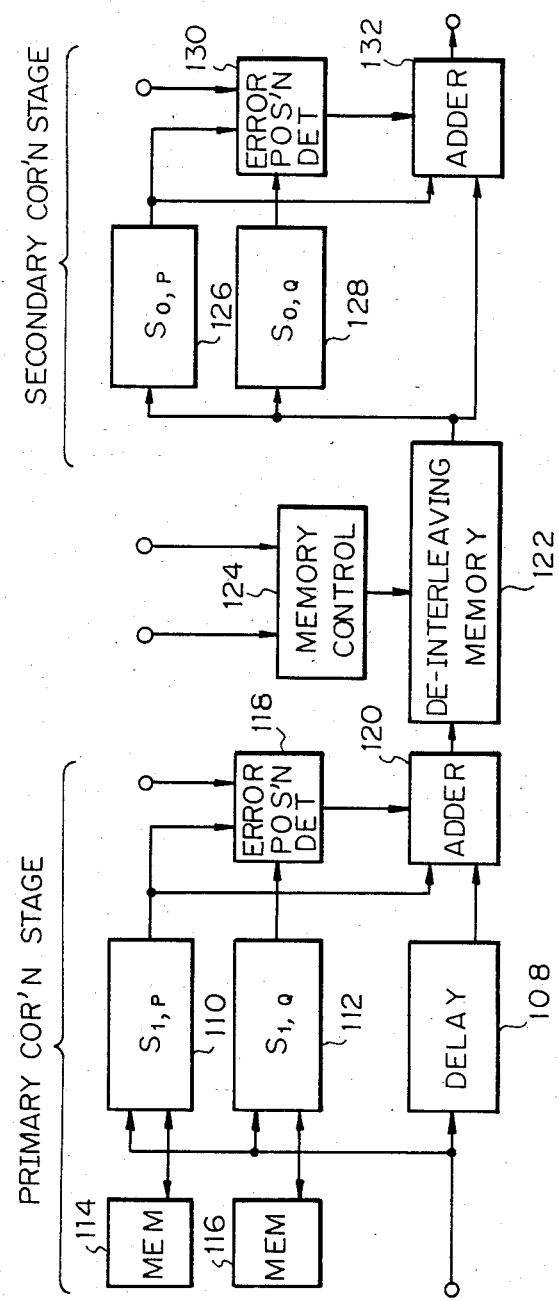
FIG. 20 is a block diagram showing a preferred example of the circuit arrangement operable for de-interleaving and correcting the sound information and parity check codes delivered from the circuit arrangement of FIG. 19.

FIG. 20 is a block diagram showing a preferred example of the circuit arrangement operable for de-interleaving and correcting the interleaved and error correction coded sound information and parity check codes delivered from the circuit arrangement of FIG. 19. The correction of errors in the supplied interleaved and error correction coded codes is effected in two consecutive stages which consist of a primary error correction stage at which errors occurring in each of the horizontal scanning lines are to be corrected and a secondary error correction stage at which errors between different horizontal scanning lines are to be corrected. In the primary error correction stage, the interleaved and error correction coded sound information and parity check codes delivered from the circuit arrangement of FIG. 19 are supplied to a delay circuit 108 and first and second syndrome generator circuits 110 and 112. The first and second syndrome generator circuits 110 and 112 are adapted to generate syndromes $S_{1,P}$ and $S_{1,Q}$, respectively. The syndromes $S_{1,P}$ and $S_{1,Q}$ to be generated by the first and second syndrome generator circuits 110 and 112, respectively, are to be used for the correction of errors in one and the same horizontal scanning line and are generated on the basis of the equations previously presented. Since, in this instance, the individual codes to be entrained on one and the same horizontal scanning line are interleaved or re-arranged in sequence, it is required that the values of the syndromes $S_{1,P}$ and $S_{1,Q}$ which are being generated be stored temporarily similarly to the parity check codes $P_{1,k}$ and $Q_{1,k}$ generated in the circuit arrangement of FIG. 19. The first and second syndrome generator circuits 110 and 112 are for this reason also provided with memory units 114 and 116, respectively, which are adapted to temporarily register the values being generated of the syndromes $S_{1,P}$ and $S_{1,Q}$. The syndromes $S_{1,P}$ and $S_{1,Q}$ produced by the first and second syndrome generator circuits 110 and 112, respectively, as above described are fed to an error position detector circuit 114 for detecting the positions of the erred codes on the basis of the syndromes $S_{1,P}$ and $S_{1,Q}$ supplied thereto. The syndrome $S_{1,P}$ generated by the first syndrome generator 110 in particular is supplied, together with the interleaved and error correction coded codes passed through the delay circuit 108, to an adder circuit 116 and is added to each of the erred ones of the codes from the delay circuit 108 in accordance with the rule of the modulo-two addition. Because, in this instance, of the fact that the syndrome $S_{1,P}$ is in the form of a modulo-two sum of parity check codes as previously described, the erred codes can be corrected when the syndrome $S_{1,P}$ is added to the particular codes in the adder circuit 116 in accordance with the rule of the modulo-two addition. The error position detector circuit 118 is supplied with clock pulses $P_1$ synchronized with the codes delivered from the delay circuit 108 and actuates the adder circuit 116 at a timing when an erred code is passed from the delay circuit 108 to the adder circuit 120. The adder circuit 120 is in this fashion enabled to add the syndrome $S_{1,P}$ to each of the erred ones of the interleaved and error correction codes supplied from the circuit arrangement of FIG. 19. The delay time predetermined for the delay circuit 108 is such that the first interleaved and error correction coded code is passed to the adder circuit 20 after the syndrome $S_{1,P}$ for the code is generated in the first syndrome generator circuit 110. The non-erred ones of the codes supplied to the adder circuit 116 are passed therethrough without change. The non-erred and error-corrected codes thus passed through the adder circuit 120 are fed to the secondary error correction stage and are written in succession into a de-interleaving memory unit 122 in the sequence in which the codes are supplied from the circuit arrangement of FIG. 19. The de-interleaving memory unit 122 is operative to write in and read out the supplied information under the control of a memory control circuit 124. The sound information and parity check codes stored in the memory unit 118 are addressed read out therefrom in the sequence indicated by the FIGS. 1 to 3 with the arrows in full lines in FIG. 17 at timings synchronized with clock and address pulses $P_2$ supplied to the memory control circuit 124. More specifically, the sound information and parity check codes registered in the de-interleaving memory unit 122 are read out in such a manner that the codes required for the generation of the syndromes $S_{0,P}$ and $S_{0,Q}$ are first read out and thereafter the sound information codes to be corrected are read out. When, for example, the sound information codes $W_0, W_1, W_2, \ldots W_{14}$ are to be read out, the sound information and parity check codes $W_0, W_1, W_2, \ldots W_{14}, P_{0,0}$ and $Q_{0,0}$ are first read out and thereafter the sound information codes $W_0, W_1, W_2, \ldots W_{14}$ to be corrected are read out. The codes (such as the codes $W_0, W_1, W_2, \ldots W_{14}, P_{0,0}$ and $Q_{0,0}$) for generating the syndromes $S_{0,P}$ and $S_{0,Q}$ are fed to third and fourth syndrome generator circuits 126 and 128 which are adapted to generate the syndromes $S_{0,P}$ and $S_{0,Q}$, respectively. While the codes for generating the syndromes $S_{0,P}$ and $S_{0,Q}$ are being thus fed to the syndrome generator circuits 126 and 128, supply of the signals from the error position detector circuit 118 to the adder circuit 120 of the primary error correction stage is interrupted. The syndromes $S_{0,P}$ and $S_{0,Q}$ generated by the third and fourth syndrome generator circuits 126 and 128, respectively, as above described are supplied to an error position detector circuit 130 for detecting the positions of the erred codes on the basis of the syndromes $S_{0,P}$ and $S_{0,Q}$ supplied thereto. The syndrome $S_{0,P}$ generated by the third syndrome generator 126 in particular is supplied, together with the de-interleaved and error correction coded codes delivered from the de-interleaving memory unit 122, to an adder circuit 128 and is added to each of the erred ones of the codes from the memory unit 122 in accordance with the rule of the modulo-two addition. Because, in this instance, of the fact that the syndrome $S_{0,P}$ is in the form of a modulo-two sum of parity check codes as previously described, the erred codes can be corrected when the syndrome $S_{0,P}$ is added to the particular codes in the adder circuit 132 in accordance with the rule of the modulo-two addition. The error position detector circuit 130 is supplied with clock pulses $P_3$ synchronized with the codes delivered from the memory unit 122 and actuates the adder circuit 132 at a timing when an erred code is passed from the memory unit 122 to the adder circuit 132. The adder circuit 132 is in this fashion enabled to add the syndrome $S_{0,P}$ to each of the erred ones of the de-interleaved and error correction codes supplied from the memory unit 122. If desired, the de-interleaving memory unit 122 may be modified so that the error correction coded codes to be read out therefrom are not only de-interleaved but time axially extended as in the circuit arrangement described with reference to FIG. 5.

As will be understood from the above description, the respective circuits of the primary and secondary error correction stages of the circuit arrangement shown in FIG. 20 have essentially similar functions. For this reason, the two error correction circuits may be substituted by a single time shared circuit constructed and arranged similarly to one of the two circuits. Thus, the construction and arrangement of the circuit shown in FIG. 20 is simply for the purpose of illustration and may be modified in numerous manners. If desired, for example, the first and second syndrome generator circuits 110 and 112 of the primary error correction stage may be connected to the output terminal of the de-interleaving memory unit 122 in parallel with of the third and fourth syndrome generator circuits 126 and 128 of the secondary error correction stage. In this instance, the generation and addition of not only the syndromes $S_{0,P}$ and $S_{0,P}$ but also the syndromes $S_{1,P}$ and $S_{1,P}$ can be effected upon readout of the data from the de-interleaving memory unit 118 and, for this reason, the temporary memory units 114 and 116 and the delay circuit 108 can be dispensed with.

What is claimed is:

1. A method of recording and reproducing a video format signal containing picture information, sound information and control information comprising:
   forming said control information as data indicative of identification numbers of sections of a two-dimensional picture format into which said sound information is to be inserted,
   recording said sound information and said control information on said recording medium in the form of binary signals each comprising a predetermined number of bits of data,
   modulating each of said binary signals before recordation on said recording medium such that the signal level is inverted between every adjacent two bits,
   reproducing the video format signal on said recording medium in a two-dimensional picture format which is divided into a plurality of sections having predetermined identification numbers respectively allocated thereto, said sections comprising at least one section for inserting said sound information in accordance with said control information, at least one section for inserting said control information and remaining sections for inserting said picture information,
   monitoring the inversions of signal level during reproduction of said picture and sound information; and
   signaling an occurrence of a burst error in response to a break in the regularity of inversions of signal level during reproduction of said picture and sound information.

2. A method as set forth in claim 1, including encoding said binary signals on horizontal scanning lines during recording of the picture and sound information on said recording medium in such a manner that the binary signals are re-arranged in sequence in each of the horizontal scanning periods and between the individual horizontal scanning periods and checking the binary signals recorded on the recording medium for errors and clearing the binary signals of the errors in each of said horizontal scanning periods and between the individual horizontal scanning periods during reproduction of said picture and sound information.

3. A method as set forth in claim 1, wherein said sections of said picture area comprise a plurality of groups having identification numbers respectively allocated thereto and wherein said control information contains pieces of information indicative of the respective identification numbers of said groups.

4. A method as set forth in claim 1, including clamping the signals to be introduced into said sections into which said sound information is to be inserted at a predetermined voltage level.

5. A method as set forth in claim 1, wherein said picture information comprises pieces of information to produce continuous motion pictures and including recording said sound information in time axially compressed form on said recording medium.

6. A method as set forth in claim 5, including registering the sound information recorded on said recording medium in information storage means and time axially extending and reading out said sound information from the information storage means during reproduction of the picture and sound information.

7. A method as set forth in claim 6, including supplying additional sound signals from an external signal source and registering said additional sound signals in said information storage means, and reading out said additional sound signals from the information storage means on a real time basis while the sound information registered in the information storage means is being time axially extended and read out therefrom.

8. A method as set forth in claim 6, wherein the sound information in each field or frame is associated with the picture information in each field or frame.

9. A method as set forth in claim 8, wherein said information storage means has at least two storage areas and including registering the sound information associated with the picture information to be reproduced in the successive fields or frames alternately in the two storage areas.

10. A method as set forth in claim 6, wherein said sound information is inserted into a predetermined number of successive fields or frames and said picture information is inserted into a predetermined number of successive fields or frames subsequent to the fields or frames into which said sound information is inserted.

11. A method as set forth in claim 10, wherein the sound information registered in said information storage means is time axially extended and read out from the storage means while the picture information is being reproduced.

12. A method as set forth in claim 6, wherein, while the picture information in a field or frame is being reproduced, the sound information associated with the picture information to be reproduced in the immediately subsequent fields or frames is registered in said information storage means and wherein the sound information registered in the memory unit is time axially extended and read out from the information storage means during reproduction of the picture information in a plurality of subsequent fields or frames.

13. A method as set forth in claim 6, wherein the fields or frames into which the sound information is to be inserted comprise a plurality of groups with with identification numbers respectively allocated thereto and wherein said control information contains pieces of information indicative of the respective identification numbers of said groups.

14. A method as set forth in claim 13, wherein each of said groups of fields or frames into which the sound information is inserted comprises a plurality of subgroups which are continuous to or discrete from each other and wherein said control information contains pieces of information indicative of the respective identification numbers of said subgroups.

15. A method as set forth in claim 14, wherein the sound information in the fields or frames of one of said subgroups in each said groups is selected and registered in said information storage means and is time axially extended and read out from the information storage means during reproduction of the information in the fields or frames of the immediately subsequent group.

16. A method as set forth in claim 14, wherein the sound information in the fields or frames of one of said subgroups in each of said groups is selected and registered in said information storage means and is time axially extended and read out from the information storage means at the end of the last field or frame in the particular subgroup.

17. A method as set forth in claim 6, wherein the sound information in one field or frame is associated with the picture information in a predetermined number of consecutive fields or frames, the readout of the sound information in one field or frames from said information storage means being started immediately after the registration of the sound information therein is started and being terminated immediately prior to the registration of the last bit of the immediately subsequent sound information.

18. A method as set forth in claim 1, wherein the step of recording comprises (1) converting an analog sound information signal into a series of corresponding digital signals, (2) converting the digital signals into error correction coded digital sound information signals, (3) interleaving the error correction coded digital sound information signals, (4) adding redundant codes to the interleaved error correction coded digital sound information signals, (5) registering the resultant digital signals in recording information storage means with a predetermined write-in sampling frequency, (6) reading out the signals from the information storage means with a predetermined read-out sampling frequency higher than the write-in sampling frequency for producing a train of error correction coded and time axially compressed digital sound information signals, (7) interleaving first digital control signals, (8) adding redundant codes to the interleaved first digital control signals for producing interleaved and error correction coded control signals, and (9) selectively passing second digital control signals, composite picture signals, said error correction coded and time axially compressed digital sound information signals and said interleaved and error correction coded control signals through switch means.

19. A method as set forth in claim 18, wherein the step of reproducing comprises (1) separating the video format signal into digital sound information signals and first and second digital control signals, the sound signals being interleaved and error correction coded and the first digital control signals being error correction coded, (2) de-interleaving and correcting the sound information signals and correcting the first digital control signals, (3) registering the deinterleaved and error corrected sound information signals into reproducing information storage means at a predetermined write-in sampling frequency, (4) reading out the sound information signals from the reproducing information storage means at a predetermined read-out sampling frequency lower than the write-in sampling frequency for the reproducing information storage means for thereby producing a train of time axially extended digital sound information signals, (5) converting the time axially extended digital sound information signals into a corresponding analog sound information signal, (6) producing composite control signals on the basis of the corrected first control signals and the second digital control signals extracted from said video format signal, and (7) extracting picture information signals from the video format signal.

20. A method as set forth in claim 19, including adding picture signals supplied from an external signal source to the picture information signals extracted from the video format signal.

21. A method as set forth in claim 19, including clamping the picture information signals extracted from the video format signal at a predetermined voltage level.

22. A method as set forth in claim 19, wherein the write-in and read-out sampling frequencies for the reproducing information storage means are equal to the read-out and write-in sampling frequencies, respectively, predetermined for said recording information storage means.

23. A method as set forth in claim 1, including error correcting said control information by (1) producing a plurality of control data blocks each including a plurality of binary control data codes representative of the control information and each comprising a predetermined number of bits and at least one binary bit correction code comprising a predetermined number of redundant bits, and a parity check block including a plurality of binary parity check codes produced on the basis of the control data codes in every consecutive two of said control data blocks and at least one binary bit correction code comprising a predetermined number of redundant bits, (2) modulating the two control data blocks and the associated parity check block so that the signal level is inverted between every adjacent two bits, (3) counting occurrences of the absence of expected signal level inversions in each of the two data each of said control data blocks and the associated parity check block, and (4) producing an error pointer signal when the number of said occurrences is larger than a predetermined value.

24. A method as set forth in claim 23, including forming the redundant bits of said bit correction codes as Bose-Chaudhuri-Hocquenghem coded redundant bits.

25. A method as set forth in claim 25, wherein each of said parity check codes is produced in the form of the modulo-two sum of one of the control data codes in one of said consecutive two control data blocks and one of the control data codes in the other of the two control data blocks.

26. A method as set forth in claim 1, including error correcting said control information by (1) producing a plurality of control data blocks each including a plurality of binary control data codes representative of the control information and each consisting of a predetermined number of bits and at least one binary bit correction code consisting of a predetermined number of redundant bits, and a parity check block including a plurality of binary parity check codes produced on the basis of the control data codes in every consecutive two of said control data blocks and at least one binary bit correction code consisting of a predetermined number of redundant bits, (2) modulating the error correction coded and modulated bits of data in each of said two control data blocks and the associated parity check block so that each of the bits has its level inverted between every adjacent two bits, (3) demodulating the modulated bits of data, (4) checking the demodulated bits of data for errors of bits in the individual codes in each of said control data blocks and said parity check block, (5) correcting erred codes in each of the control data blocks and the parity check block blocks, (6) generating a syndrome in the form of the modulo-two sum of the initial control data blocks, and (7) producing the modulo-two sum of said syndrome and the corrected codes of the control data blocks and the parity check block for eliminating burst errors in the corrected codes.

27. A method as set forth in claim 1, wherein said sound information comprises a predetermined number of sound data codes to be inserted into each of said sections of said picture area and including correcting errors in said sound date codes by (1) arranging said sound data codes firstly in a three-dimensional matrix having a predetermined number of sections in a first direction, a predetermined number of sections in a second direction perpendicular to the first direction direction and a predetermined number of sections in a third direction perpendicular to the first and second directions, said sound data codes being sequentially arranged in the individual three-dimensional sections of the matrix in the sequence of the first, second and third directions, (2) adding at least one first parity check code to the sound data codes in each of the arrays in one of the first, second and third directions and at least one second parity check code to the sound data codes in each of the arrays in another direction, (3) sampling the sound data codes and the parity check codes in a sequence different from the sequence in which the sound data codes are arranged, (4) superposing the codes in each of the arrays in one of the first, second and third direction on one of horizontal scanning lines to form a field, and (5) correcting errors in the codes in each of the horizontal scanning lines on the basis of one of said first and second parity check codes and errors between every consecutive two of the horizontal scanning lines on the basis of one the other said first and second parity check codes.

28. A method as set forth in claim 27, wherein said first parity check code is produced on the basis of the sound data codes in each of the arrays in one of the first, second and third directions of said matrix and said second parity check code is produced on the basis of the sound data codes in each of the arrays in another direction of the matrix.

29. A method as set forth in claim 1, wherein said sound information consists of binary sound information codes each composed of a predetermined number of bits and wherein errors in the sound information are corrected by (1) generating a first series of parity check codes and a second series of parity check codes, (2) interleaving the sound data and parity check codes in accordance with a predetermined principle for producing interleaved sound data and parity check codes, (3) generating first and second syndromes on the basis of the interleaved sound data and parity check codes, (4) detecting the locations of erred ones of the interleaved sound data and parity check codes on the basis of said first and second syndromes, (5) producing the modulo-two sum of one of the first and second syndromes and each of the erred ones of the interleaved sound data and parity check codes for correcting errors in the codes in one of the horizontal scanning lines to produce a field, (6) de-interleaving the interleaved and corrected sound data and parity check codes (7) generating third and fourth syndromes on the basis of the de-interleaved sound data and parity check codes, (8) detecting the locations of erred ones of the de-interleaved sound data and parity check codes on the basis of the third and fourth syndromes, and (9) producing the modulo-two sum of the third syndrome and each of the de-interleaved sound data and parity check codes for correcting errors between every consecutive two of said horizontal scanning lines.

* * * * *